(12) United States Patent
Lee et al.

(10) Patent No.: US 10,615,424 B2
(45) Date of Patent: Apr. 7, 2020

(54) NON-NOBLE METAL BASED CATALYST AND METHOD OF MANUFACTURING THE SAME

(71) Applicants: Hyundai Motor Company, Seoul (KR); Kia Motors Corporation, Seoul (KR); Postech Academy—Industry Foundation, Pohang-si (KR)

(72) Inventors: Ju Hee Lee, Seoul (KR); Won Jung Kim, Seoul (KR); Seonggyu Lee, Seoul (KR); Jinwoo Lee, Pohang-si (KR)

(73) Assignees: Hyundai Motor Company, Seoul (KR); Kia Motors Corporation, Seoul (KR); Postech Academy-Industry Foundation, Pohang-si (KR)

( * ) Notice: Subject to any disclaimer, the term of this patent is extended or adjusted under 35 U.S.C. 154(b) by 130 days.

(21) Appl. No.: 15/597,634

(22) Filed: May 17, 2017

(65) Prior Publication Data

US 2018/0175395 A1    Jun. 21, 2018

(30) Foreign Application Priority Data

Dec. 21, 2016 (KR) ........................ 10-2016-0175354

(51) Int. Cl.
*H01M 4/90* (2006.01)
(52) U.S. Cl.
CPC ........... *H01M 4/9083* (2013.01); *H01M 4/90* (2013.01)

(58) Field of Classification Search
None
See application file for complete search history.

(56) References Cited

FOREIGN PATENT DOCUMENTS

| JP | 2008-243697 A | 10/2008 |
|---|---|---|
| JP | 2016-203133 A | 12/2016 |

OTHER PUBLICATIONS

Proietti et al, Iron-based cathode catalyst with enhanced power density in polymer electrolyte membrane fuel cells, nature communications, Aug. 2, 2011, pp. 1-9 (Year: 2011).*

* cited by examiner

*Primary Examiner* — Sarah A. Slifka
(74) *Attorney, Agent, or Firm* — Morgan, Lewis & Bockius LLP

(57) ABSTRACT

Embodiments of the present invention relate to non-noble metal-based catalysts used as electrode materials for fuel cells, and methods of manufacturing the same.

In an aspect of the present inventions, provided herein is a non-noble metal-based catalyst for an electrode of a fuel cell. The non-noble metal-based catalyst comprise a porous carbon having a first pore and a second pore smaller than the first pore. The first pore has a pore size of about 5 to 100 nm and has an inner wall into which an active site of the non-noble metal-based catalyst is introduced.

8 Claims, 22 Drawing Sheets

BET SURFACE AREA: 930 m²/g
< TEM IMAGE OF MSUFC >

< PORE SIZE DISTRIBUTION OF MSUFC >

< PORE SIZE DISTRIBUTION OF MSUFC >

BET SURFACE AREA:954㎡/g
< TEM IMAGE OF NON-NOBLE METAL-BASED CATALYST >

< PORE SIZE DISTRIBUTION OF NON-NOBLE METAL-BASED CATALYST >

POROUS CARBON     NON-NOBLE METAL-BASED CATALYST PRECURSOR     NON-NOBLE METAL-BASED CATALYST

< ORR WITH RESPECT TO TYPES OF NON-NOBLE METAL-BASED CATALYST >

< ORR DEPENDING ON INTRODUCTION ANCHORING SITE >

< ORR WITH RESPECT TO HEAT-TREATMENT CONDITIONS >

< PERFORMANCE OF SINGLE CELL WITH RESPECT TO SPRAYING METHOD >

< PERFORMANCE OF SINGLE CELL WITH RESPECT TO NCR >

< PERFORMANCE OF SINGLE CELL WITH RESPECT
TO LOADING AMOUNT OF CATALYST >

< DURABILITY TEST >

< ORR WITH RESPECT TO POSITION OF CATALYTIC ACTIVE SITE >

< PERFORMANCE OF SINGLE CELL WITH RESPECT
TO POSITION OF CATALYTIC ACTIVE SITE >

NON-NOBLE METAL BASED CATALYST AND METHOD OF MANUFACTURING THE SAME

CROSS-REFERENCE TO RELATED APPLICATION(S)

The present application claims under 35 U.S.C. § 119(a) the benefit of Korean Patent Application No. 10-2016-0175354, filed on Dec. 21, 2016, the entire contents of which is incorporated herein for all purposes by this reference.

BACKGROUND OF THE INVENTION

Field of the Invention

The present invention relate to non-noble metal-based catalysts used as electrode materials for fuel cells, and methods of manufacturing the same.

Description of Related Art

In conventional proton exchange membrane fuel cells (PEMFCs), fine particles including a noble metal with high catalytic activity and high potential, particularly, platinum, as a main ingredient, have been widely used as an electrode catalyst.

However, since platinum is a rare metal having a high cost, a need to develop alternative non-noble metal-based catalysts for oxygen reduction reaction of fuel cells having high activity and replacing platinum catalysts is increasing.

Research has been conducted into a method of using an additive such as zirconium oxide to reduce the use of platinum. A method of manufacturing a transition metal oxynitride electrode catalyst by attaching oxynitride of a transition metal to the surface of a support material by sputtering has been reported.

However, non-noble metal-based electrode catalysts currently available have unsatisfactory catalytic activity, and thus performance of fuel cells including the same can be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a non-noble metal-based catalyst having a catalytic active site selectively positioned on the surfaces of micropores and a method of manufacturing the same. According to an exemplary embodiment of the present invention, types of non-noble metal-based catalyst precursors used to manufacture non-noble metal-based catalysts and processing parameters therefor may be controlled.

Additional aspects of the disclosure will be set forth in part in the description which follows and, in part, will be obvious from the description, or may be learned by practice of the disclosure.

In an aspect of the present inventions, there is provided a non-noble metal-based catalyst for an electrode of a fuel cell. The non-noble metal-based catalyst comprise a porous carbon having a first pore and a second pore smaller than the first pore, the first pore has a pore size of about 5 to 100 nm (e.g., about 5 nm, 10, 15, 20, 25, 30, 35, 40, 45. 50, 55, 60, 65, 70, 75, 80. 85. 90. 95 or about 100 nm) and has an inner wall into which an active site of the non-noble metal-based catalyst is introduced.

The porous carbon may have a structure in which the first pore and the second pore are uniformly connected in a three-dimensional space.

The first pore may have a pore size of about 15 to 60 nm (e.g., about 15, 16, 17, 18, 19, 20, 21, 22, 23, 24, 25, 26, 27, 28, 29, 30, 31, 32, 33, 34, 35, 36, 37, 38,39, 40, 41, 42, 43, 44, 45, 46, 47, 48, 49, 50, 51, 52, 53, 54, 55, 56, 57, 58, 59, or about 60 nm).

An active site of the non-noble metal-based catalyst may be provided in a form represented by Formula 1 below:

$$M_xN_y \qquad \text{Formula 1}$$

wherein x is an integer from 0 to 1, y is an integer from 1 to 4, and M is a transition metal.

The active site of the non-noble metal-based catalyst may be formed by a non-noble metal-based catalyst precursor.

The non-noble metal-based catalyst precursor may have a form in which at least one of phthalocyanine, phthalocyanine tetrasulfonate, octabutoxy phthalocyanine, hexadecafluoro phthalocyanine, octakis octyloxy phthalocyanine, tetra-tert-butyl phthalocyanine, tetraaza phthalocyanine, tetraphenoxy phthalocyanine, tetra-tert-butyl tetrakis dimethylamino phthalocyanine, tetrakis cumylphenoxy phthalocyanine, tetrakis pyridiniomethyl phthalocyanine, tetranitrophthalocyanine, naphthalocyanine, tetra-tert-butyl naphthalocyanine, tetraphenyl porphine, tetrakis pentafluorophenyl porphyrin, tetrakis methylpyridinio porphyrin tetratoluenesulfonate, tetrakistrimethylammoniophenyl porphyrin tetratoluenesulfonate, tetramethyl divinyl porphinedipropionic acid, tetrapyridyl porphine, octaethyl porphyrin, tetrakis methoxyphenyl porphine, tetraphenylporphine tetracarboxylic acid, tetrakis hydroxyphenyl porphine, tetrakis sulfonatophenyl porphine, etioporphyrin, 1,10-phenanthroline, 1,10-phenanthroline-5,6-dionedimethyl-1,10-phenanthroline, dimethyl-1,10-phenanthroline, dimethoxy-1,10-phenanthroline, dimethoxy-1,10-phenanthroline, amino-1,10-phenanthroline, methyl-1,10-phenanthroline, dihydroxy-1,10-phenanthroline, tetramethyl-1,10-phenanthroline, chloro-1,10-phenanthroline, dichloro-1,10-phenanthroline, nitro-1,10-phenanthroline, bromo-1,10-phenanthroline, tetrabromo-1,10-phenanthroline, pyrazino[1,10]phenanthroline, diphenyl-1,10-phenanthroline, dimethyl diphenyl-1,10-phenanthroline, ethenyl formyl(hydroxy trimethyltetradecyl) trimethyl porphine dipropanoato, diethenyl tetramethyl porphine dipropanoato, bis((amino carboxyethyl)thio)ethyl tetramethyl porphine dipropanoato, dihydro dihydroxy tetramethyl divinyl porphine dipropionic acid lactonato, ethenyl(hydroxy trimethyl tetradecatrienyl) tetramethyl porphine dipropanoato, carboxyethenyl carboxyethyl dihydro bis(hydroxymethyl) tetramethyl porphine dicarboxylato, (dimethylbenzimidazolyl)cyanocobamide, curtis macrocycle, Jäger macrocycle and DOTA macrocycle, is coordinated to a metal.

The metal may comprise at least one transition metal selected from iron (Fe), cobalt (Co), manganese (Mn), nickel (Ni), and chromium (Cr).

The non-noble metal-based catalyst precursor may comprise a transition metal having a weight of about 1 to 50 wt % (e.g., about 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 wt %) based on a total weight of the porous carbon.

The porous carbon may have an anchoring site introduced into a surface of a pore of the porous carbon to enhance interactions between the porous carbon and the non-noble metal-based catalyst precursor.

According to another aspect of the present invention, there is provided a method of manufacturing a non-noble metal-based catalyst for an electrode of a fuel cell. The method may comprise mixing a porous carbon with a non-noble metal-based catalyst precursor; heat-treating the mixture at a temperature of about 600 to 1200° C. (e.g., about 600° C., 650° C., 700° C., 750° C., 800° C., 850° C., 900° C., 950° C., 1000° C., 1100° C., or about 1200° C.); stirring the heat-treated mixture in an acidic solution; and washing and drying the stirred mixture.

The porous carbon may have a first pore and a second pore smaller than the first pore, and the first pore has a pore size of 5 to 100 nm in the mixing of the porous carbon with the non-noble metal-based catalyst precursor.

The first pore may have a pore size of 15 to 60 nm (e.g., about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or about 60 nm).

The method may further comprise heat-treating solid powder acquired after the drying in an ammonia ($NH_3$) gas atmosphere at a temperature of about 600° C. to about 1200° C. (e.g., about 600° C., 650° C., 700° C., 750° C., 800° C., 850° C., 900° C., 950° C., 1000° C., 1100° C., or about 1200° C.) for about 5 to 60 minutes (e.g., about 5 minutes, 10, 15, 20, 25, 30, 35, 40, 45, 50, 55, or about 60 minutes).

The method may further comprise forming an anchoring site on a surface of a pore of the porous carbon by heat-treating the porous carbon in an ammonia ($NH_3$) gas atmosphere at a temperature of about 600° C. to about 1200° C. (e.g., about 600° C., 650° C., 700° C., 750° C., 800° C., 850° C., 900° C., 950° C., 1000° C., 1100° C., or about 1200° C.) for about 5 to 60 minutes (e.g., about 5 minutes, 10, 15, 20, 25, 30, 35, 40, 45, 50, 55, or about 60 minutes).

The non-noble metal-based catalyst precursor may have a form in which at least one of phthalocyanine, phthalocyanine tetrasulfonate, octabutoxy phthalocyanine, hexadecafluoro phthalocyanine, octakis octyloxy phthalocyanine, tetra-tert-butyl phthalocyanine, tetraaza phthalocyanine, tetraphenoxy phthalocyanine, tetra-tert-butyl tetrakis dimethylamino phthalocyanine, tetrakis cumylphenoxy phthalocyanine, tetrakis pyridiniomethyl phthalocyanine, tetranitrophthalocyanine, naphthalocyanine, tetra-tert-butyl naphthalocyanine, tetraphenyl porphine, tetrakis pentafluorophenyl porphyrin, tetrakis methylpyridinio porphyrin tetratoluenesulfonate, tetrakistrimethylammoniophenyl porphyrin tetratoluenesulfonate, tetramethyl divinyl porphinedipropionic acid, tetrapyridyl porphine, octaethyl porphyrin, tetrakis methoxyphenyl porphine, tetraphenylporphine tetracarboxylic acid, tetrakis hydroxyphenyl porphine, tetrakis sulfonatophenyl porphine, etioporphyrin, 1,10-phenanthroline, 1,10-phenanthroline-5,6-dionedimethyl-1,10-phenanthroline, dimethyl-1,10-phenanthroline, dimethoxy-1,10-phenanthroline, dimethoxy-1,10-phenanthroline, amino-1,10-phenanthroline, methyl-1,10-phenanthroline, dihydroxy-1,10-phenanthroline, tetramethyl-1,10-phenanthroline, chloro-1,10-phenanthroline, dichloro-1,10-phenanthroline, nitro-1,10-phenanthroline, bromo-1,10-phenanthroline, tetrabromo-1,10-phenanthroline, pyrazino[1,10]phenanthroline, diphenyl-1,10-phenanthroline, dimethyl diphenyl-1,10-phenanthroline, ethenyl formyl(hydroxy trimethyltetradecyl) trimethyl porphine dipropanoato, diethenyl tetramethyl porphine dipropanoato, bis((amino carboxyethyl)thio)ethyl tetramethyl porphine dipropanoato, dihydro dihydroxy tetramethyl divinyl porphine dipropionic acid lactonato, ethenyl(hydroxy trimethyl tetradecatrienyl) tetramethyl porphine dipropanoato, carboxyethenyl carboxyethyl dihydro bis(hydroxymethyl) tetramethyl porphine dicarboxylato, (dimethylbenzimidazolyl)cyanocobamide, curtis macrocycle, Jäger macrocycle and DOTA macrocycle, is coordinated to a metal, in the mixing of the porous carbon with the non-noble metal-based catalyst precursor.

The metal may comprise at least one transition metal selected from iron (Fe), cobalt (Co), manganese (Mn), nickel (Ni), and chromium (Cr).

The non-noble metal-based catalyst precursor may comprise a transition metal having a weight of 1 to 50 wt % based on a total weight of the porous carbon, in the mixing of the porous carbon with the non-noble metal-based catalyst precursor.

The heat-treating of the mixture at a temperature of 600 to 1200° C. may comprise heat-treating the mixture in an inert gas atmosphere at a temperature of 600 to 1200° C. for 10 to 300 minutes.

The stirring of the heat-treated mixture in an acidic solution may comprise adding the heat-treated mixture to an acidic solution having a concentration of 0.1 M or greater and stirring the resultant mixture.

Figure 1:
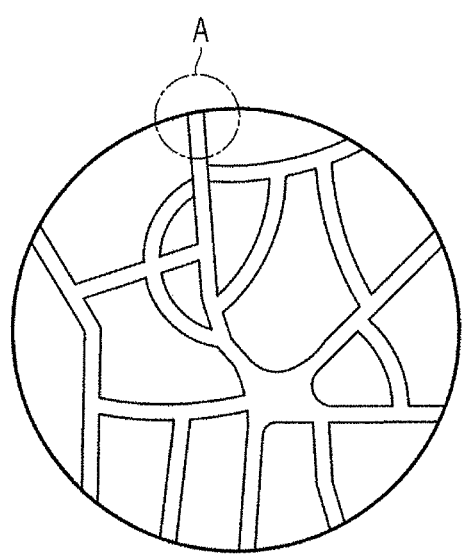
FIG. 1 is a schematic cross-sectional view of a non-noble metal-based catalyst for fuel cell electrodes according to an embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Also, it is to be understood that the terms "include" or "have" are intended to indicate the existence of elements disclosed in the specification, and are not intended to preclude the possibility that one or more other elements may exist or may be added.

In this specification, terms "first," "second," etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

The present invention relates to a nanoporous non-noble metal-based catalyst having a uniform structure, and a method of manufacturing the same.

The non-noble metal-based catalyst according to an exemplary embodiment of the present invention is used in oxygen reduction reaction taking place in cathodes of proton exchange membrane fuel cells (PEMFCs). The non-noble metal-based catalyst may be prepared by doping a non-noble metal-based catalyst precursor into a carbon composite having macropores on the surface thereof. Thus, manufacturing costs may be reduced in comparison with the conventional platinum catalyst, and the non-noble metal-based catalyst having several tens of nanoscale pores may reduce mass transfer resistance in a membrane electrode assembly (MEA).

Hereinafter, a structure of the non-noble metal-based catalyst for fuel cell electrodes according to an exemplary embodiment will be described and then the method of manufacturing the same will be described.

Figure 2:
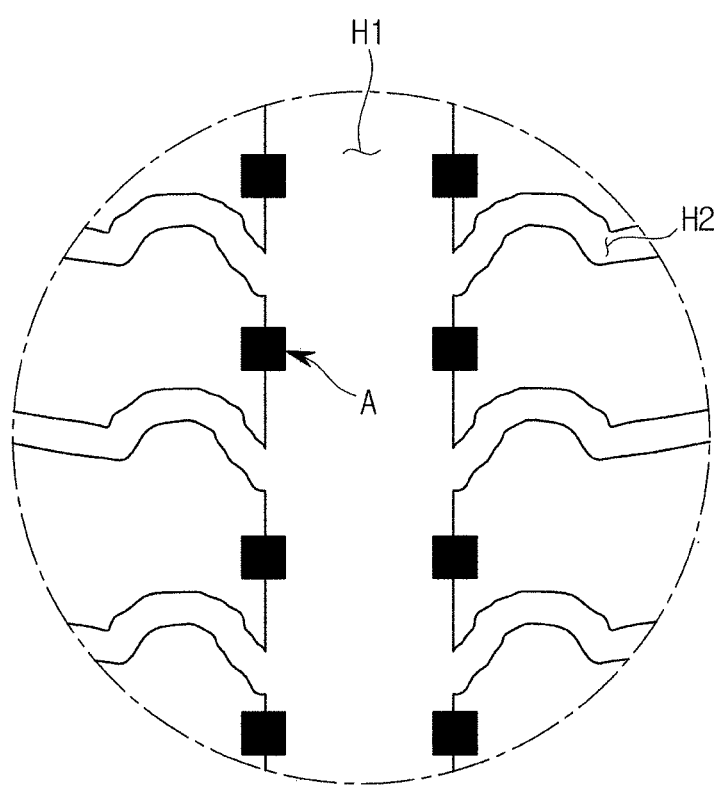
FIG. 2 is an exploded view of a portion A of FIG. 1.

FIG. 1 is a schematic cross-sectional view of a non-noble metal-based catalyst for fuel cell electrodes according to an embodiment. FIG. 2 is a magnified view of a portion A of FIG. 1.

Referring to FIGS. FIG. 1 and FIG. 2, the non-noble metal-based catalyst for fuel cell electrodes has a structure in which active sites of the non-noble metal-based catalyst are introduced into inner walls of pores of porous carbon.

While a platinum catalyst used in general fuel cell electrodes is loaded on the surface of carbon, the non-noble metal-based catalyst according to an exemplary embodiment is formed by doping the non-noble metal-based catalyst precursor into the porous carbon structure, in other words, by introducing a non-noble metal-based catalyst precursor into a carbon network structure of the porous carbon.

As the porous carbon, a porous carbon material having pores may be used. The pores of the surface of the porous carbon may include first pores and second pores smaller than the first pores. More particularly, the first pores of the porous carbon may have a pore size of about 5 to 100 nm (e.g., about 5 nm, 10, 15, 20, 25, 30, 35, 40, 45. 50, 55, 60, 65, 70, 75, 80. 85. 90. 95 or about 100 nm), preferably, 15 to 50 nm (e.g., about 5 nm, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38,39, 40, 41, 42, 43, 44, 45, 46, 47, 48, 49, or about 50 nm). The second pores may have a pore size of several nm that is the smallest pore size obtained during the preparation of the porous carbon. Throughout the specification, the first pores may be referred to as micropores, and the second pores may be referred to as ultrafine pores.

The first pores and the second pores may form a uniformly connected structure in a three-dimensional space. Hereinafter, a structure of the porous carbon and pore size distribution data will be described based on MSUFC porous carbon used herein.

Figure 3:
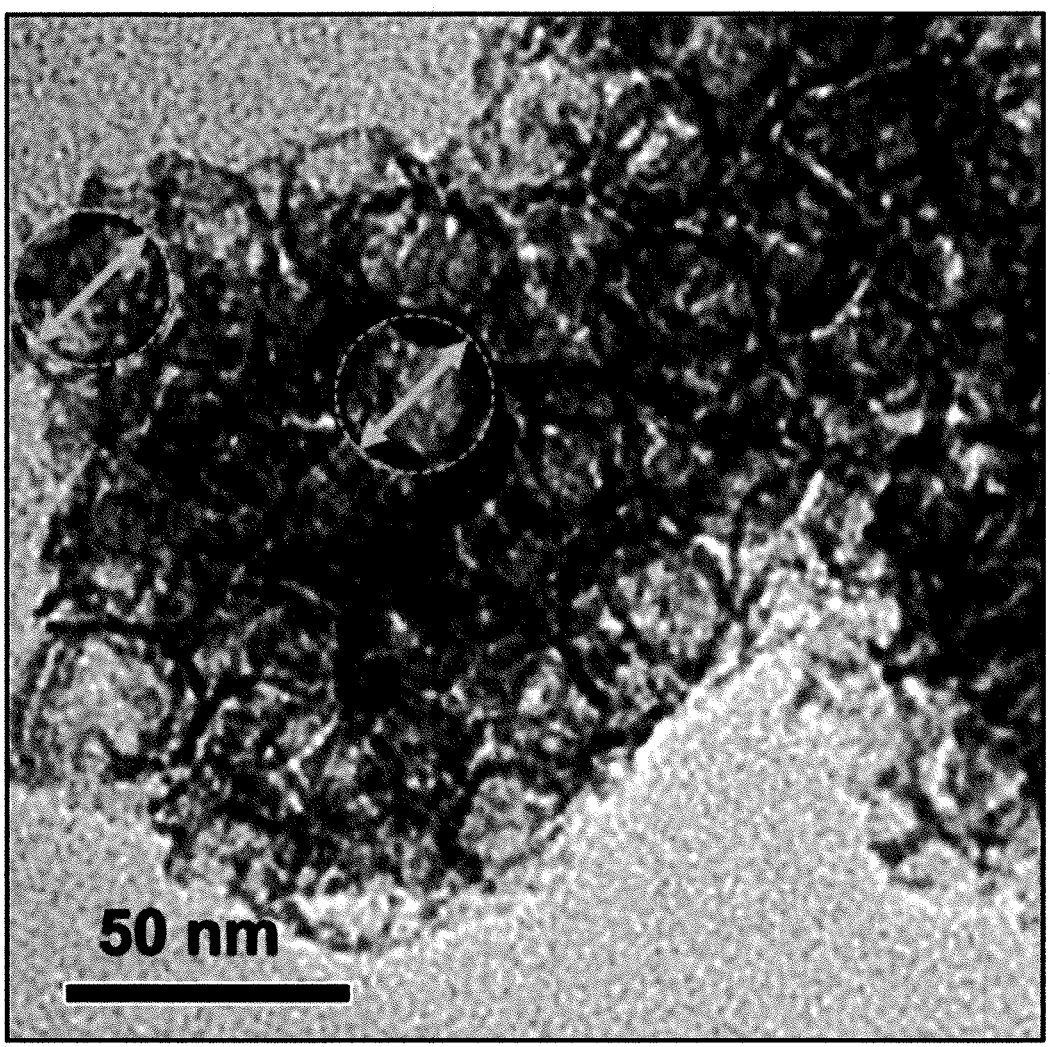
FIG. 3 is a transmission electron microscopic (TEM) image of a structure of MSUFC porous carbon.
Figure 4:
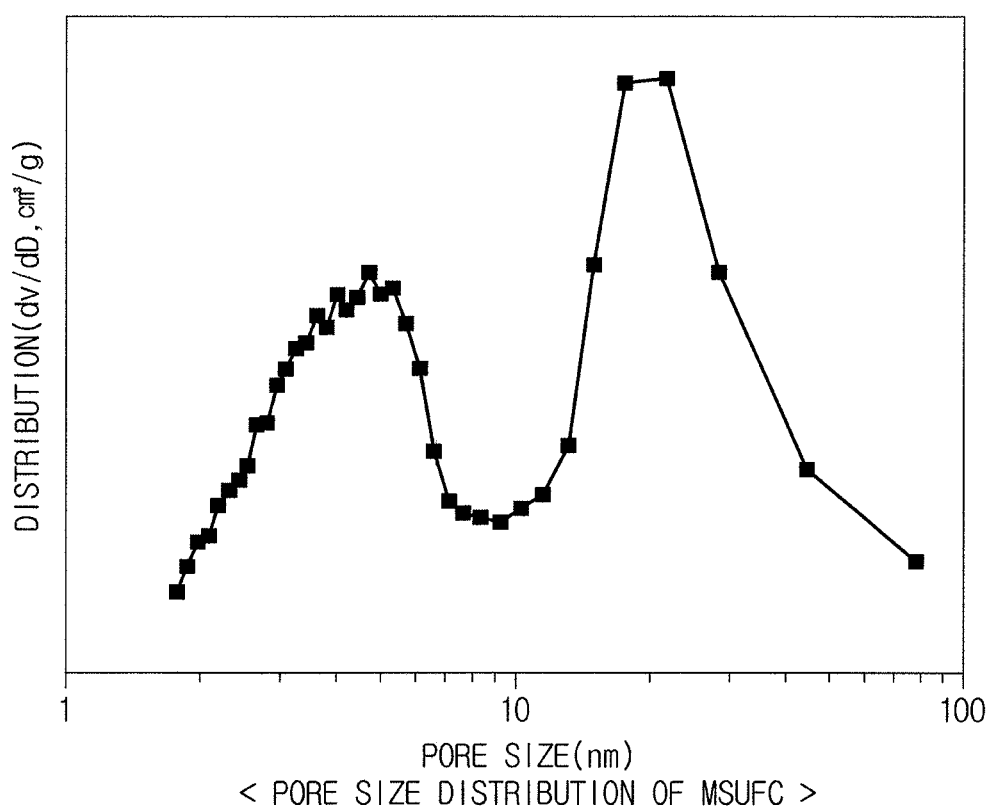
FIG. 4 is a graph illustrating pore size distribution of micropores of the MSUFC porous carbon.
Figure 5:
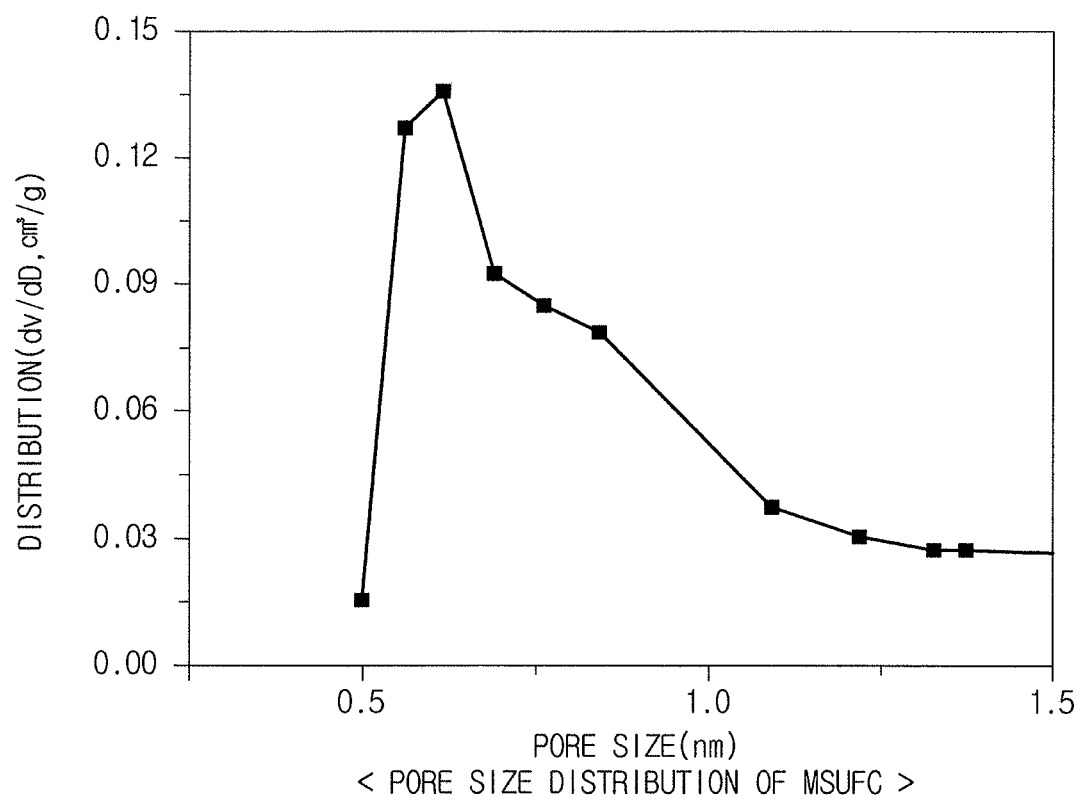
FIG. 5 is a graph illustrating pore size distribution of ultrafine pores of the MSUFC porous carbon.

FIG. 3 is a transmission electron microscopic (TEM) image of a structure of MSUFC porous carbon. FIG. 4 is a graph illustrating pore size distribution of micropores of the MSUFC porous carbon. FIG. 5 is a graph illustrating pore size distribution of ultrafine pores of the MSUFC porous carbon.

Referring to FIGS. FIG. 3 and FIG. 4, it is confirmed that micropores having a pore size of about 15 to about 60 nm are formed on the surface of the MSUFC porous carbon and a channel having a size of about 2 to about 10 nm is formed therein. Also, referring to FIGS. 3 and 5, it is confirmed that ultrafine pores having a pore size of about 0.5 to about 1.5 nm are formed on the surface of the MSUFC porous carbon.

In general, if the pore size of the porous carbon is less than 15 nm, mass transfer resistance may increase. If the pore size of the porous carbon is greater than 60 nm, specific surface area of the porous carbon may decrease. Thus, the first pores having a pore size of about 5 to 100 nm (e.g., about 5 nm, 10, 15, 20, 25, 30, 35, 40, 45. 50, 55, 60, 65, 70, 75, 80. 85. 90. 95, or about 100 nm), preferably, 5 to 60 nm (e.g., about 5 nm, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38,39, 40, 41, 42, 43, 44, 45, 46, 47, 48, 49, 50, 51, 52, 53, 54, 55, 56, 57, 58, 59, or about 60 nm), may be introduced into the carbon structure according to an exemplary embodiment to obtain satisfactory mass transfer resistance and specific surface area.

Active sites of the non-noble metal-based catalyst are formed on the inner walls of the first pores of the porous carbon as illustrated in FIG. 3. The active sites of the non-noble metal-based catalyst may be formed by using a non-noble metal-based catalyst precursor. According to the present embodiment, a non-noble metal-based catalyst precursor having a diameter less than that of the first pores and greater than that of the second pores may be used to control conditions for the manufacturing process, such that the active sites of the non-noble metal-based catalyst are selectively formed on the surfaces of the first pores.

For example, if iron phthalocyanine having a diameter of about 1.2 nm is used as the non-noble metal-based catalyst precursor, most of the second pores are smaller than the non-noble metal-based catalyst precursors, and thus, almost all of the non-noble metal-based catalyst precursors may interact with the surfaces of the first pores to form the catalytic active sites selectively on the inner walls of the first pores. Meanwhile, since the channel of the porous carbon has a size of about 2 to about 10 nm as described above, the catalytic active site may also be formed on portions of the inner walls of the channel.

Figure 6:
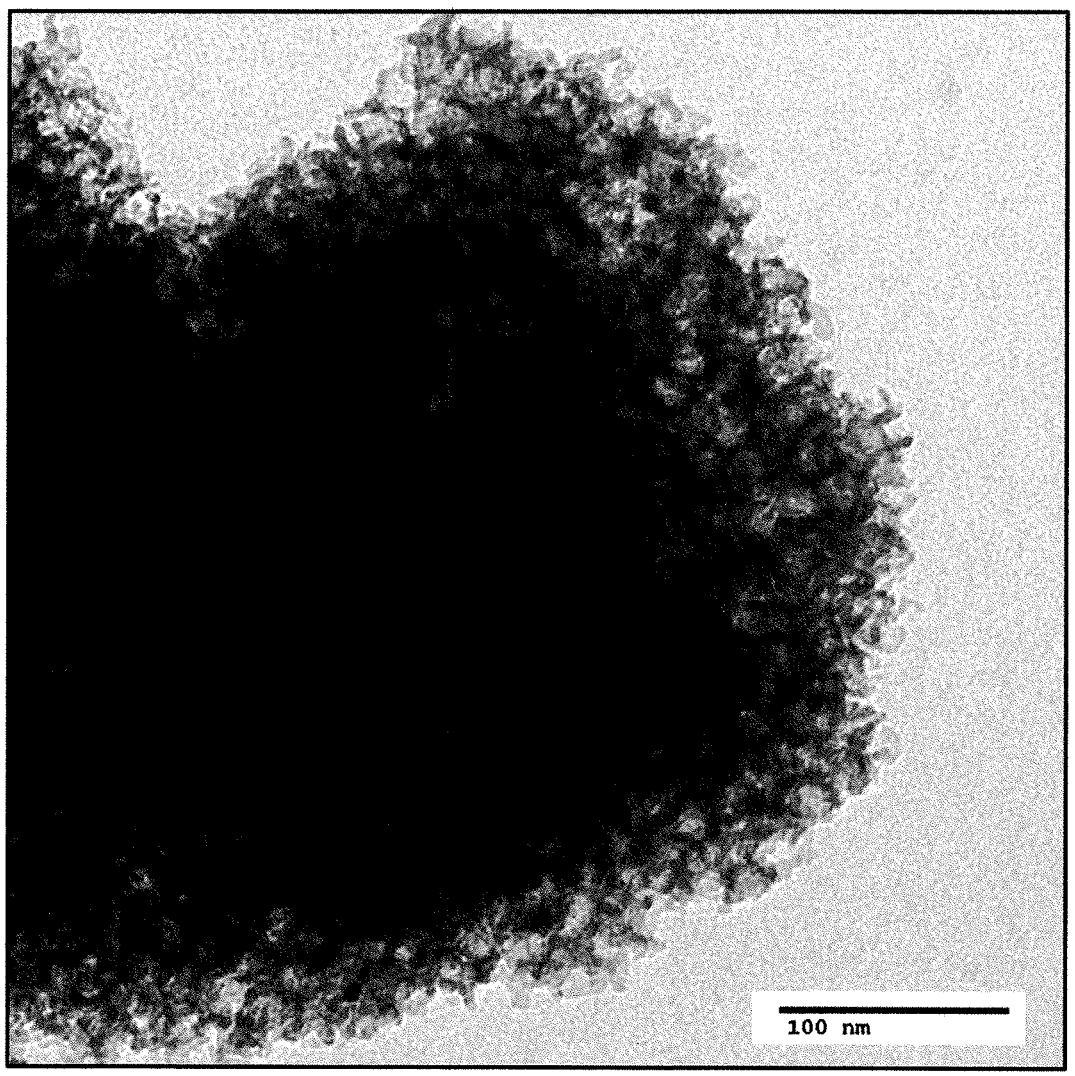
FIG. 6 is a TEM image of a structure of a final non-noble metal-based catalyst.
Figure 7:
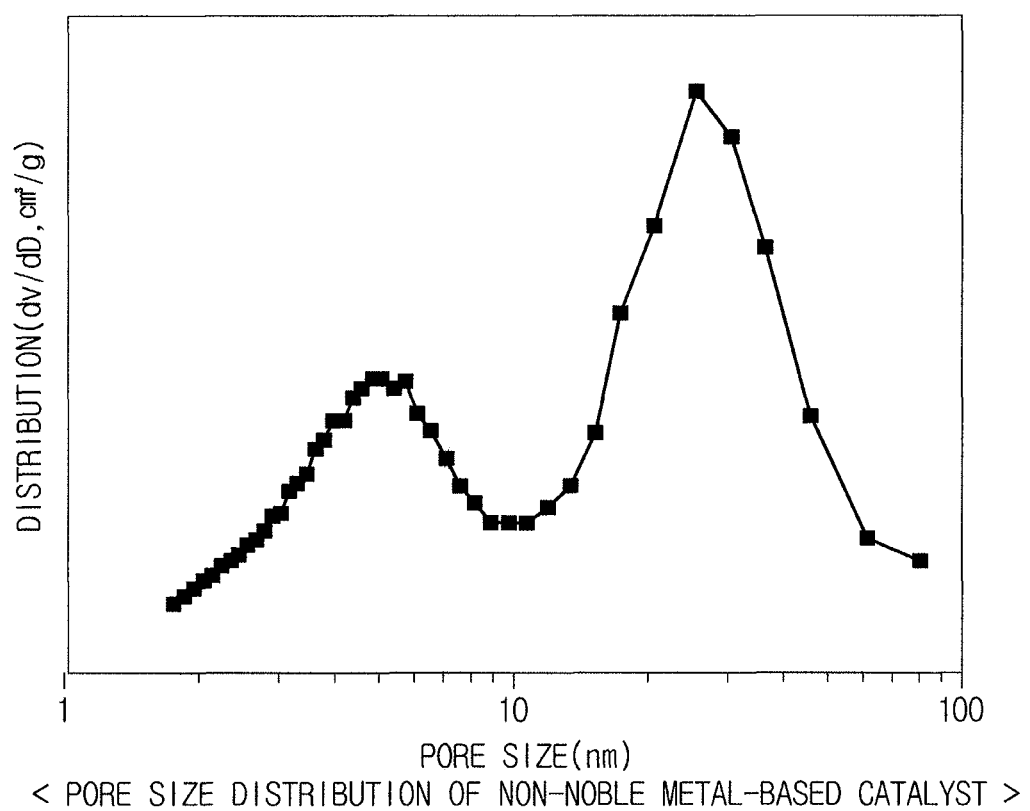
FIG. 7 is a graph illustrating pore size distribution of micropores of the non-noble metal-based catalyst.

FIG. 6 is a TEM image of a structure of a final non-noble metal-based catalyst. FIG. 7 is a graph illustrating pore size distribution of micropores of the non-noble metal-based catalyst. FIGS. FIG. 6 and FIG. 7 illustrate results of experiments in case of using iron phthalocyanine as the non-noble metal-based catalyst precursor.

The results shown in FIGS. FIG. 6 and FIG. 7 are compared with those shown in FIGS. FIG. 3 and FIG. 4. In case of the non-noble metal-based catalyst according to an exemplary embodiment in which the porous carbon is doped with the non-noble metal-based catalyst precursor, it may be confirmed that the distribution of pores decreases after doping the porous carbon with the non-noble metal-based catalyst precursor. Thus, it may be confirmed that the non-noble metal-based catalyst precursor is doped into the surfaces of the channel structure and the first pores of the porous carbon and the active sites are formed.

The non-noble metal-based catalyst precursor may have a form in which at least one of phthalocyanine, phthalocyanine tetrasulfonate, octabutoxy phthalocyanine, hexadecafluoro phthalocyanine, octakis octyloxy phthalocyanine, tetra-tert-butyl phthalocyanine, tetraaza phthalocyanine, tetraphenoxy phthalocyanine, tetra-tert-butyl tetrakis dimethylamino phthalocyanine, tetrakis cumylphenoxy phthalocyanine, tetrakis pyridiniomethyl phthalocyanine, tetranitrophthalocyanine, naphthalocyanine, tetra-tert-butyl naphthalocyanine, tetraphenyl porphine, tetrakis pentafluorophenyl porphyrin, tetrakis methylpyridinio porphyrin tetratoluenesulfonate, tetrakistrimethylammoniophenyl porphyrin tetratoluenesulfonate, tetramethyl divinyl porphinedipropionic acid, tetrapyridyl porphine, octaethyl porphyrin, tetrakis methoxyphenyl porphine, tetraphenylporphine tetracarboxylic acid, tetrakis hydroxyphenyl porphine, tetrakis sulfonatophenyl porphine, etioporphyrin, 1,10-phenanthroline, 1,10-phenanthroline-5,6-dionedimethyl-1,10-phenanthroline, dimethyl-1,10-phenanthroline, dimethoxy-1,10-phenanthroline, dimethoxy-1,10-phenanthroline, amino-1,10-phenanthroline, methyl-1,10-phenanthroline, dihydroxy-1,10-phenanthroline, tetramethyl-1,10-phenanthroline, chloro-1,10-phenanthroline, dichloro-1,10-phenanthroline, nitro-1,10-phenanthroline, bromo-1,10-phenanthroline, tetrabromo-1,10-phenanthroline, pyrazino[1,10]phenanthroline, diphenyl-1,10-phenanthroline, dimethyl diphenyl-1,10-phenanthroline, ethenyl formyl(hydroxy trimethyltetradecyl) trimethyl porphine dipropanoato, diethenyl tetramethyl porphine dipropanoato, bis((amino carboxyethyl)thio)ethyl tetramethyl porphine dipropanoato, dihydro dihydroxy tetramethyl divinyl porphine dipropionic acid lactonato, ethenyl(hydroxy trimethyl tetradecatrienyl) tetramethyl porphine dipropanoato, carboxyethenyl carboxyethyl dihydro bis(hydroxymethyl) tetramethyl porphine dicarboxylato, (dimethylbenzimidazolyl)cyanocobamide, curtis macrocycle, Jäger macrocycle and DOTA macrocycle, is coordinated to a metal ion. In this case, the metal may include at least one transition metal selected from the group consisting of iron (Fe), cobalt (Co), manganese (Mn), nickel (Ni), and chromium (Cr).

Meanwhile, the types of the non-noble metal-based catalyst precursor are not limited thereto and may also be broadly understood as a concept including modifications within a range obvious to those of ordinary skill in the art.

The non-noble metal-based catalyst precursor may include a transition metal such that a weight of the transition metal is in the range of about 1 to 50 wt % (e.g., about 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 wt %) based on a total weight of the porous carbon.

If the weight of the transition metal is less than 1 wt % based on the total weight of the porous carbon, the catalytic active sites may not be appropriately formed. If the weight of the transition metal is greater than 50 wt % based on the total weight of the porous carbon, all of the non-noble metal-based catalyst precursors cannot enter the first pores of the porous carbon and are located on the surface of the porous carbon. Thus, the weight of the transition metal needs to be adjusted based on the total weight of the porous carbon.

Meanwhile, the porous carbon may have anchoring sites introduced into the surfaces of pores of the porous carbon according to an exemplary embodiment to increase interactions between the porous carbon and the non-noble metal-based catalyst precursor. A process of introducing the anchoring sites into the surfaces of the pores of the porous carbon may include doping the surface of the porous carbon with nitrogen atoms in various manners before doping the surface of the porous carbon with the non-noble metal-based catalyst precursor.

Hereinafter, probability of catalytic active site formation when anchoring sites are introduced or not introduced into the pore surfaces of the porous carbon will be described with reference to the accompanying drawings.

Figure 8:
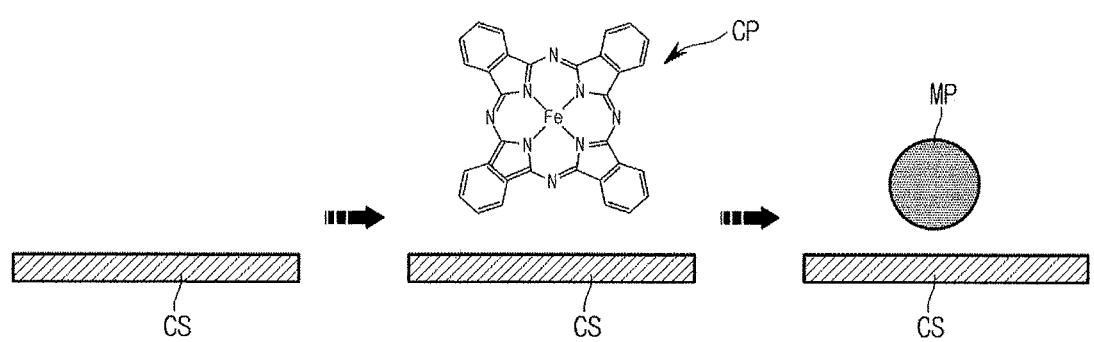
FIG. 8 is a diagram schematically illustrating a reaction taking place on the surface of a pore of the porous carbon into which an anchoring site is not introduced.
Figure 9:
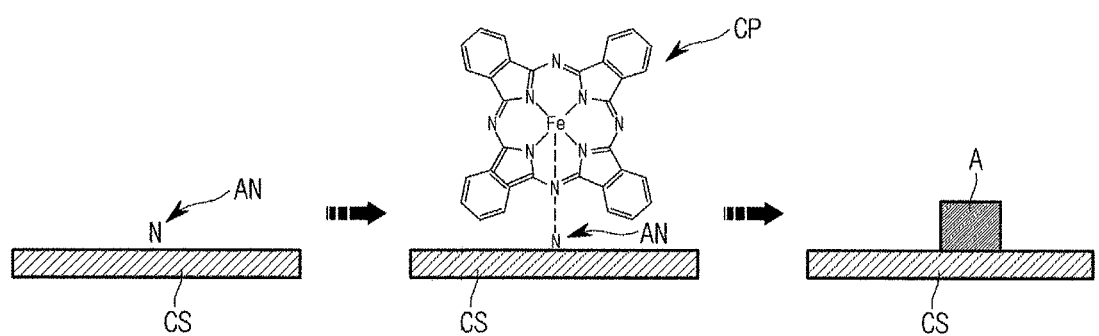
FIG. 9 is a diagram schematically illustrating a reaction taking place on the surface of a pore of the porous carbon into which an anchoring site is introduced.

FIG. 8 is a diagram schematically illustrating a reaction taking place on the surface of a pore of the porous carbon into which an anchoring site is not introduced. FIG. 9 is a diagram schematically illustrating a reaction taking place on the surface of a pore of the porous carbon into which an anchoring site is introduced.

Referring to FIG. 8, if the anchoring sites are not formed on the pore surfaces CS of the porous carbon, interactions between the carbon particles on the pore surfaces CS and the non-noble metal-based catalyst precursors CP are weak, so that a probability of catalytic active site formation decreases. In this case, transition metal particles MP may be formed on the pore surfaces CS of the porous carbon with the laps of time. The transition metal particles MP may be eluted by an acidic solution, which will be described later.

Referring to FIG. 9, if the anchoring sites AN are formed on the pore surfaces CS of the porous carbon, the anchoring sites AN may enhance interactions between carbon particles on the pore surfaces CS and the non-noble metal-based catalyst precursors CP. In other words, agglomeration of the non-noble metal-based catalyst precursors CP may be prevented by enhancing interactions between carbon particles and the non-noble metal-based catalyst precursors CP by using the nitrogen atoms doped into the pore surfaces CS of the porous carbon as the anchoring sites AN. In addition, formation of the catalytic active sites A may be enhanced to increase the catalytic activity of the non-noble metal-based catalyst.

The active site A of the non-noble metal-based catalyst formed by the non-noble metal-based catalyst precursor and the anchoring site may be represented by Formula 1 below.

$$M_xN_y \qquad \text{Formula 1}$$

In Formula 1, x is an integer from 0 to 1, y is an integer from 1 to 4, and M is a transition metal such as iron (Fe), cobalt (Co), manganese (Mn), nickel (Ni), and chromium (Cr).

The structure of the non-noble metal-based catalyst for fuel cell electrodes according to an exemplary embodiment has been described above. Hereinafter, a method of manufacturing the non-noble metal-based catalyst will be described.

Figure 10:
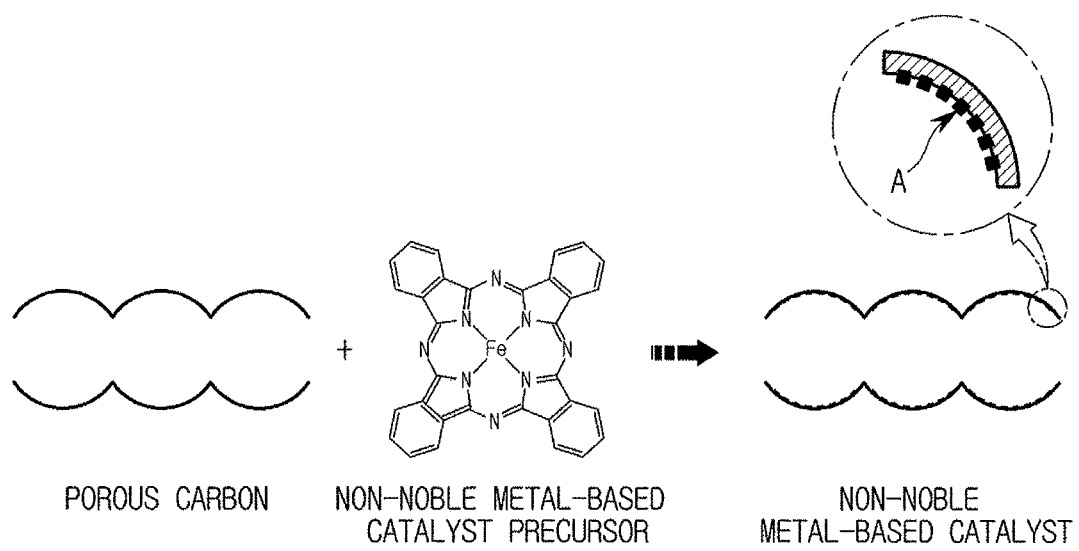
FIG. 10 is a schematic diagram illustrating a process of manufacturing a non-noble metal-based catalyst according to an embodiment.
Figure 11:
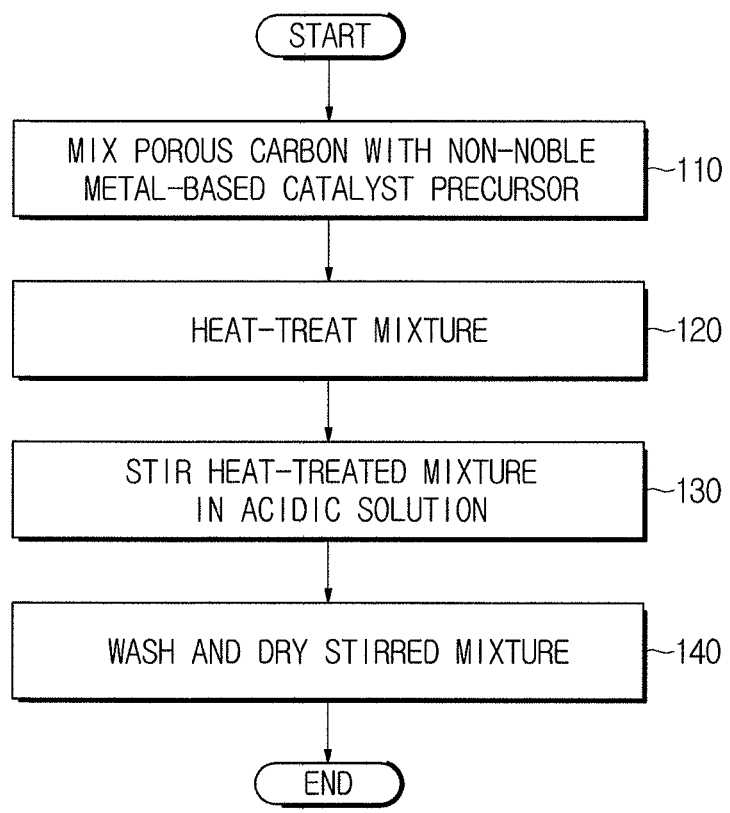
FIG. 11 is a flowchart for describing the process of manufacturing the non-noble metal-based catalyst.

FIG. 10 is a schematic diagram illustrating a process of manufacturing a non-noble metal-based catalyst according to an embodiment. FIG. 11 is a flowchart for describing the process of manufacturing the non-noble metal-based catalyst.

Referring to FIGS. FIG. 10, and FIG. 11, the process of manufacturing the non-noble metal-based catalyst according to an exemplary embodiment includes mixing a porous carbon with a non-noble metal-based catalyst precursor (110), heat-treating the mixture (120), stirring the heat-treated mixture in an acidic solution (130), and washing and drying the stirred mixture (140).

First, the mixing of the porous carbon with the non-noble metal-based catalyst precursor includes preparing the porous carbon and mixing the porous carbon with the non-noble metal-based catalyst precursor.

The preparation of the porous carbon may include a process of synthesizing MSUFC. The process of synthesizing MSUFC is as follows.

First, 9 mL of furfuryl alcohol is mixed with 6 g of AlMSUF-Si while adding the furfuryl alcohol by small quantities at a time, and the mixture is maintained at room temperature in a vacuum for 30 minutes. Then, the vacuum state is maintained in an oven at 85° C. for 8 hours. Then, solid powder obtained therefrom is carbonized in an inert gas atmosphere at 850° C. for 2 hours. The carbonization is performed by increasing the temperature to 600° C. at a rate of 1° C./min and to 850° C. at a rate of 5° C./min. Then, the carbonized solid powder is added to a 2 M sodium hydroxide (NaOH) solution and the mixture is stirred while being heated in boiling water at 80° C. for 6 hours. Then, the resultant mixture is washed using distilled water under a reduced pressure until the resultant has a neutral pH and dried to obtain MSUFC.

However, the aforementioned method is an example of synthetizing MSUFC, and any other methods obvious to one of ordinary skill in the art may also be used therefor.

Upon completion of the synthesis of MSUFC, the porous carbon and the non-noble metal-based catalyst precursor are mixed.

Types of the non-noble metal-based catalyst available during the mixing process of the porous carbon and the non-noble metal-based catalyst precursor are as described above. In this regard, the activity of oxygen reduction reaction is determined depending on the types of the non-noble metal-based catalyst precursor. Hereinafter, results of experiments of the activity of oxygen reduction reaction depending on the experiments of the non-noble metal-based catalyst precursor will be described for better understandings.

Figure 12:
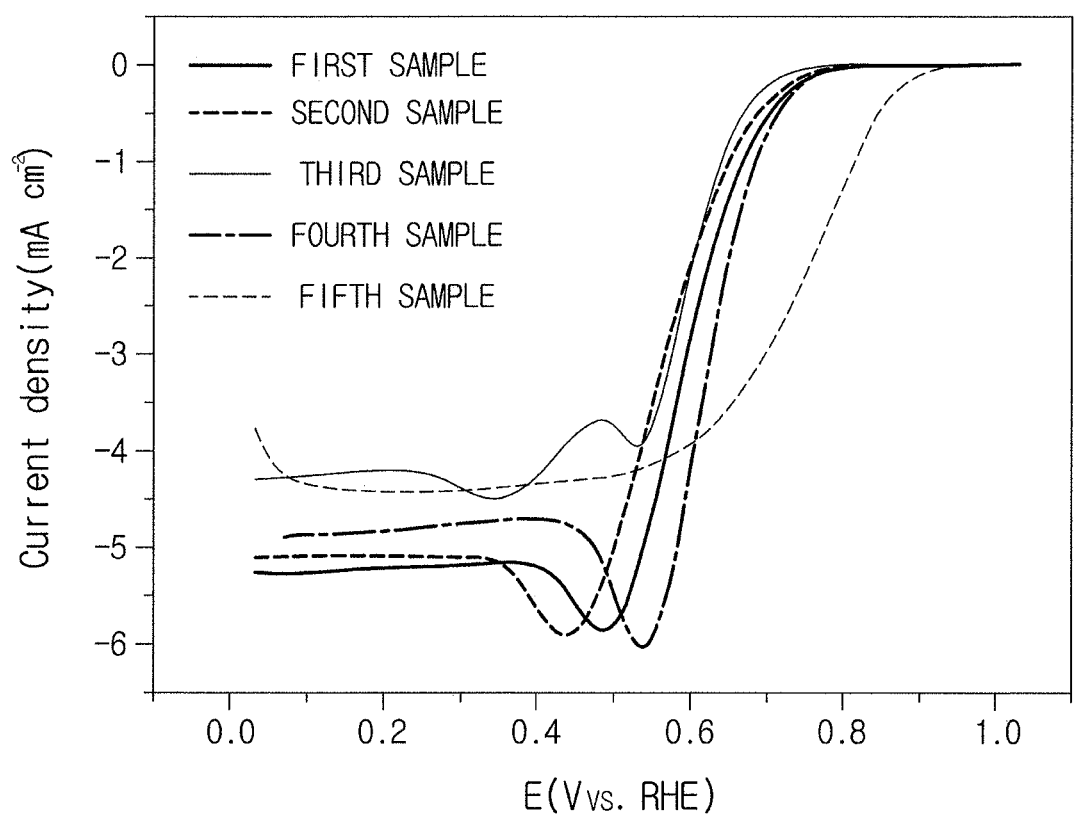
FIG. 12 is a graph illustrating results of oxygen reduction reaction (ORR) with respect to the types of the non-noble metal-based catalyst precursor.

FIG. 12 is a graph illustrating results of oxygen reduction reaction (ORR) with respect to the types of the non-noble metal-based catalyst precursor.

FIG. 12 illustrates ORR results of first to fifth samples measured using a 0.5 M oxygen-saturated sulfuric acid ($H_2SO_4$) solution, a non-noble metal-based catalyst in a loading amount of 815 μg/cm², and 40 wt % Pt/C in a loading amount of 16 μgpt/cm² at 1600 rpm.

In this regard, the first sample is a non-noble metal-based catalyst sample using iron phthalocyanine as the non-noble metal-based catalyst precursor, the second sample is a non-noble metal-based catalyst sample using iron phenanthroline as the non-noble metal-based catalyst precursor, the third sample is a non-noble metal-based catalyst sample using vitamin B12 as the non-noble metal-based catalyst precursor, the fourth sample is a non-noble metal-based catalyst sample using 5, 10, 15, 20-tetrakis(4-methoxyphenyl)-21H, 23H-porphine iron (III) chloride as the non-noble metal-based catalyst precursor, and the fifth sample is a supported catalyst in which platinum (Pt) is supported on carbon.

As a result of analyzing half wave potentials measured at −3 mA/cm² based on the graph of FIG. 12, it may be confirmed that the fifth sample has the highest half wave potential, and the half wave potential decreases in the order of the fourth sample, the first sample, the third sample, and the second sample. As the half wave potential increases, the catalytic activity increases. Therefore, it may be confirmed that the fifth sample using the platinum catalyst has the highest catalytic activity.

Meanwhile, it may also be confirmed that the half wave potentials of the first to fourth samples using the non-noble metal-based catalyst precursors are slightly lower than the half wave potential of the fifth sample. Thus, it may be confirmed that non-noble metal-based catalysts having relatively excellent catalytic activity may be obtained using the non-noble metal-based catalyst precursors with reduced manufacturing costs therefor.

Meanwhile, the amount of the non-noble metal-based catalyst precursor may be adjusted such that the amount of the transition metal contained in the non-noble metal-based catalyst precursor is in the range of about 1 to 50 wt % (e.g., about 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 wt %) based on the total weight of the porous carbon in the mixing of the porous carbon with the non-noble metal-based catalyst precursor. The significance of the weight range of the transition metal added to the porous carbon is as described above, and descriptions presented above will not be repeated herein.

The mixing of the porous carbon with the non-noble metal-based catalyst precursor according to an exemplary embodiment may include introducing anchoring sites to the porous carbon. This process may be performed to enhance interactions between the porous carbon and the non-noble metal-based catalyst precursor. However, this process may be dispensed with.

Figure 13:
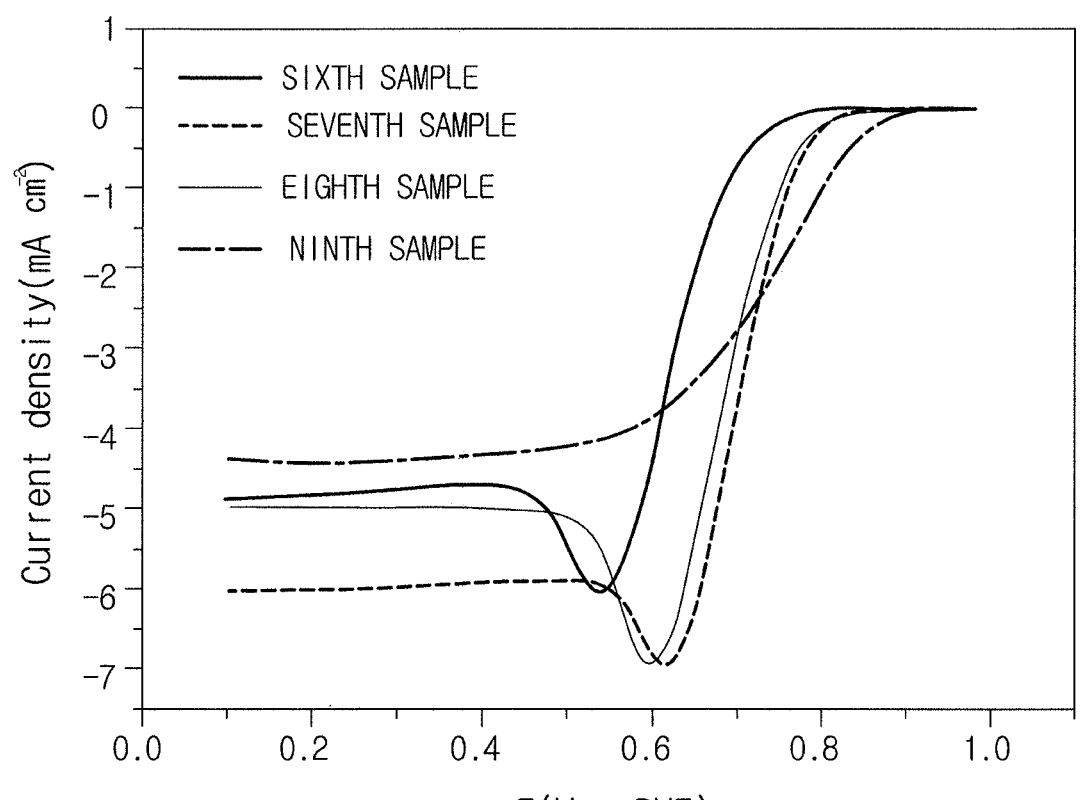
FIG. 13 is a graph illustrating results of illustrating oxygen reduction reaction (ORR) depending on introduction of anchoring sites.

FIG. 13 is a graph illustrating results of illustrating oxygen reduction reaction (ORR) depending on introduction of anchoring sites.

FIG. 13 illustrates ORR results of sixth to ninth samples measured using a 0.5 M oxygen-saturated $H_2SO_4$ solution, a non-noble metal-based catalyst in a loading amount of 815 µg/cm$^2$, and 40 wt % Pt/C in a loading amount of 16 µg pt/cm$^2$ at 1600 rpm.

In this regard, the sixth sample is a non-noble metal-based catalyst sample using 5, 10, 15, 20-tetrakis(4-methoxyphenyl)-21H, 23H-porphine iron(III) chloride as the non-noble metal-based catalyst precursor, the seventh sample is a non-noble metal-based catalyst sample using iron phthalocyanine as the non-noble metal-based catalyst precursor after introducing anchoring sites into the porous carbon, the eighth sample is a non-noble metal-based catalyst sample using 5, 10, 15, 20-tetrakis(4-methoxyphenyl)-21H, 23H-porphine iron(III) chloride as the non-noble metal-based catalyst precursor after introducing anchoring sites into the porous carbon, and the ninth sample is a supported catalyst in which platinum (Pt) is supported on carbon.

As a result of analyzing half wave potentials measured at −3 mA/cm$^2$ based on the graph of FIG. 13, it may be confirmed that the seventh sample has the highest half wave potential, and the half wave potential decreases in the order of the eighth sample, the ninth sample, and the sixth sample. Particularly, upon comparison between the sixth sample and the eighth sample, it may be confirmed that the eighth sample having anchoring sites introduced into the porous carbon using nitrogen has far higher catalytic activity than the sixth sample with no anchoring sites. Also, since the catalytic activity of the seventh and eighth samples is higher than that of the ninth sample using the noble metal catalyst, it may be confirmed that a decrease in the catalytic activity caused by using the non-noble metal-based catalyst may be prevented by introducing the anchoring sites.

After the porous carbon is mixed with the non-noble metal-based catalyst precursor, the mixture may be heat-treated.

The heat-treatment of the mixture may be performed by heat-treating the mixture at a temperature of 600 to 1200° C. in an inert gas atmosphere for about 10 to 300 minutes. Here, types of the inert gas may include argon (Ar), nitrogen ($N_2$), helium (He), and neon (Ne), without being limited thereto.

If a heat-treatment temperature is lower than 600° C., the catalytic active sites are not efficiently formed on the surface of the porous carbon. If the heat-treatment temperature is higher than 1200° C., the structure of the porous carbon may easily break. Meanwhile, since performance of the ORR varies according to the heat-treatment temperature in the range of 600° C. to 1200° C., the heat-treatment conditions may be adjusted appropriately depending on desired activity of the non-noble metal-based catalyst. Variation of the catalytic activity depending on the heat-treatment conditions will be described later.

After heat-treating the mixture, the heat-treated mixture is added to an acidic solution and the resultant mixture may be stirred. This process is performed to remove inactive transition metal compounds.

The stirring of the heat-treated mixture in an acidic solution may include adding the heat-treated mixture to an inorganic acidic solution having a concentration of 0.1 M or greater and stirring the resultant mixture. Types of the inorganic acidic solution may include a 0.5 M $H_2SO_4$ solution, without being limited thereto.

Meanwhile, the acidic solution may have a concentration of 0.1 M or greater. If the concentration of the acidic solution is less than 0.1 M, it may be difficult to sufficiently remove the inactive transition metal compounds. Thus, the concentration of the acidic solution may be appropriately controlled, if required.

After this stirring process, the stirred mixture may be washed and dried. This process may include continuously washing the mixture using distilled water under a reduced pressure until the resultant has a neutral pH and then drying the washed mixture.

Meanwhile, after washing the stirred mixture and drying the washed mixture, solid powder obtained by the washing and drying process may further be heat-treated in an ammonia ($NH_3$) gas atmosphere. In general, a carbon network of the porous carbon has defects. As nitrogen is introduced into the defects of the porous carbon, the catalytic activity may further be enhanced.

This process may include heat-treating the solid powder at a temperature of about 600 to 1200° C. in an ammonia gas atmosphere for about 5 to 60 minutes.

If the heat-treatment temperature is less than 600° C., the surface of the non-noble metal-based catalyst may not be efficiently doped with nitrogen. If the heat-temperature is greater than 1200° C., the structure of the porous carbon may easily break. Also, if a heat-treatment time is less than 5 minutes, the surface of the non-noble metal-based catalyst is not sufficiently doped with nitrogen. If the heat-treatment time is greater than 60 minutes, the structure of the non-noble metal-based catalyst may easily break. Thus, the heat-treatment temperature and the heat-treatment time need to be appropriately adjusted to efficiently introduce nitrogen into the surface of the porous carbon.

Hereinafter, variation of the catalytic activity in accordance with the heat-treatment conditions will be described with reference to the accompanying drawings. Heat-treatment conditions in operations 120 and 140 will be described in more detail based on the following experiments.

Figure 14:
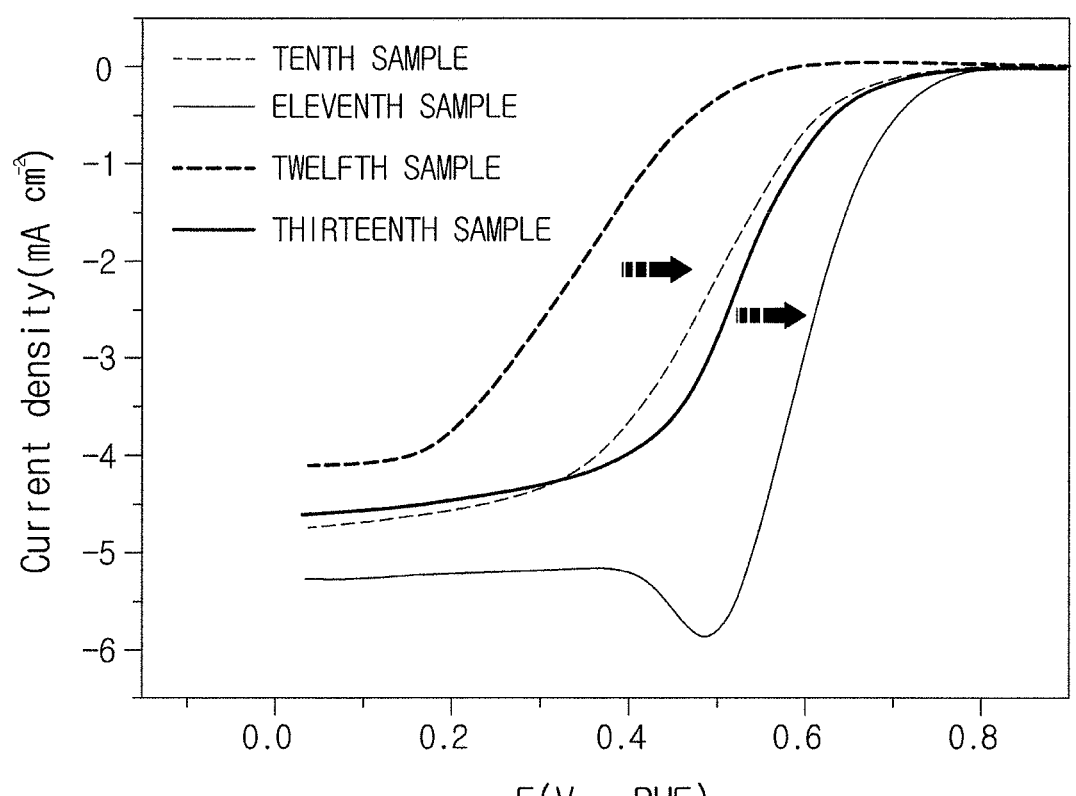
FIG. 14 is a graph illustrating results of ORR with respect to heat-treatment conditions.

FIG. 14 is a graph illustrating results of ORR with respect to heat-treatment conditions.

FIG. 14 illustrates ORR results of tenth to thirteenth samples measured using a 0.5 M oxygen-saturated $H_2SO_4$ solution and a non-noble metal-based catalyst in a loading amount of 815 µg/cm$^2$ at 1600 rpm.

In this regard, the tenth to thirteenth samples are non-noble metal-based catalyst samples using iron phthalocyanine and heat-treated under different heat-treatment conditions. Particularly, the tenth sample is a non-noble metal-based catalyst sample heat-treated at 900° C. in an argon gas atmosphere for 60 minutes. The eleventh sample is a non-noble metal-based catalyst sample teat-treated at 900° C. in an argon gas atmosphere for 60 minutes, and then further heat-treated at 950° C. in an ammonia gas atmosphere for 15 minutes. The twelfth sample is a non-noble metal-based catalyst sample heat-treated at 1050° C. in an argon gas atmosphere for 60 minutes. The thirteenth sample is a non-noble metal-based catalyst sample heat-treated at 1050° C. in an argon gas atmosphere for 60 minutes, and then further heat-treated at 950° C. in an ammonia gas atmosphere for 15 minutes.

As a result of analyzing half wave potentials measured at −3 mA/cm$^2$ based on the graph of FIG. 14, it may be confirmed that the tenth sample heat-treated at 900° C. has better catalytic activity than the twelfth sample heat-treated at 1050° C. Meanwhile, it may also be confirmed that the catalytic activity is further enhanced via the additional heat-treatment of the non-noble metal-based catalyst in the ammonia gas atmosphere based on comparison of the half wave potentials between the tenth and eleventh samples and between the twelfth and thirteenth samples.

The method of manufacturing the non-noble metal-based catalyst according to an exemplary embodiment has been described above. Hereinafter, conditions for efficiently introducing the non-noble metal-based catalyst prepared as described above into an electrode structure of fuel cells will be described.

Meanwhile, there is a need to determine whether the non-noble metal-based catalyst according to an exemplary embodiment has a 4-e path before describing the conditions. If the non-noble metal-based catalyst has a 4-e path, water ($H_2O$) is generated by side reactions. However, if the non-noble metal-based catalyst has a 2-e path, hydrogen peroxide ($H_2O_2$) is generated by side reactions, thereby decreasing efficiency of the catalyst. Thus, hereinafter, analysis results of half cells will be described in order to determine whether the non-noble metal-based catalyst has the 4-e path.

Analysis of half cells is designed as follows.

First, 10 mg of the synthesized non-noble metal-based catalyst is dispersed in a mixed solution of 2 ml ethanol and 10 µl of a 5 wt % Nafion solution for 30 minutes by sonication. Here, a non-noble metal-based catalyst sample prepared by doping the porous carbon having anchoring sites with the iron phthalocyanine catalyst precursor is used as the non-noble metal-based catalyst sample to calculate the number of electron involved in reaction. Hereinafter, the non-noble metal-based catalyst sample prepared by doping the porous carbon having the anchoring sites with the iron phthalocyanine catalyst precursor may be referred to as an N-Phth for descriptive convenience.

16 µl of the as-prepared solution is coated on a polished glassy carbon having diameter of 5 mm and dried at room temperature, and the aforementioned drying process is repeated once.

Figure 15:
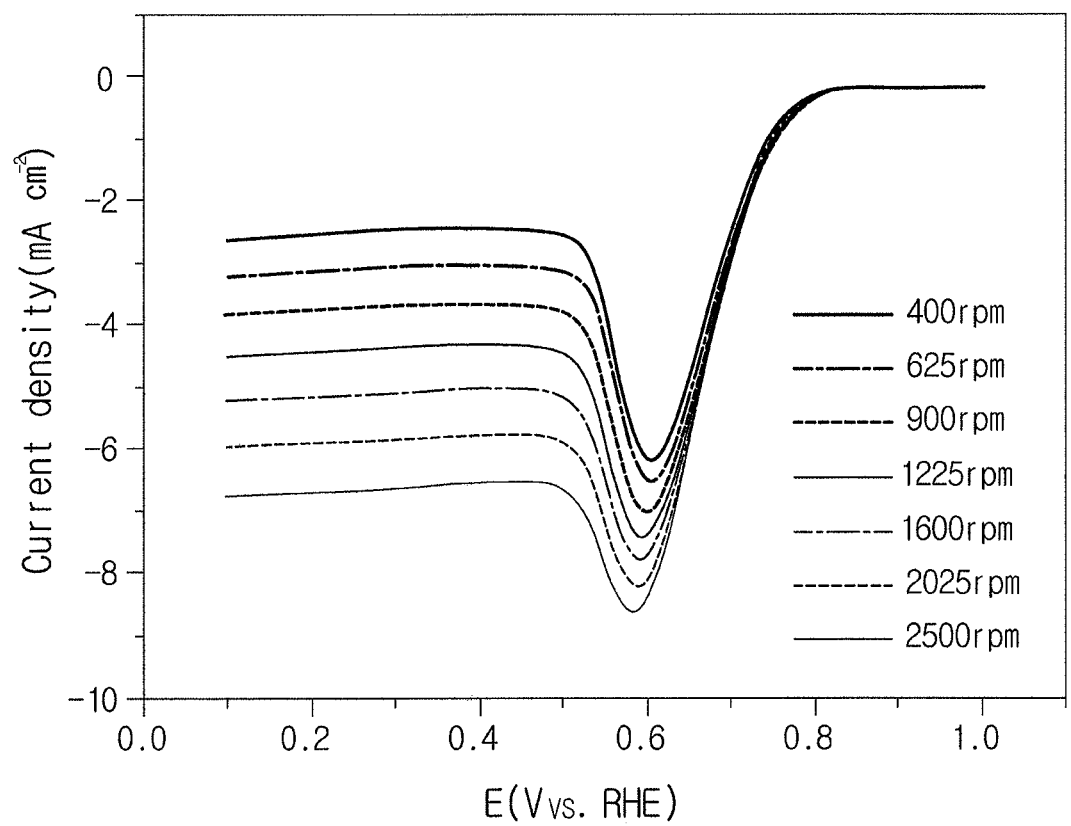
FIG. 15 and FIG. 16 are graphs illustrating Koutecky-Levich plots.
Figure 16:
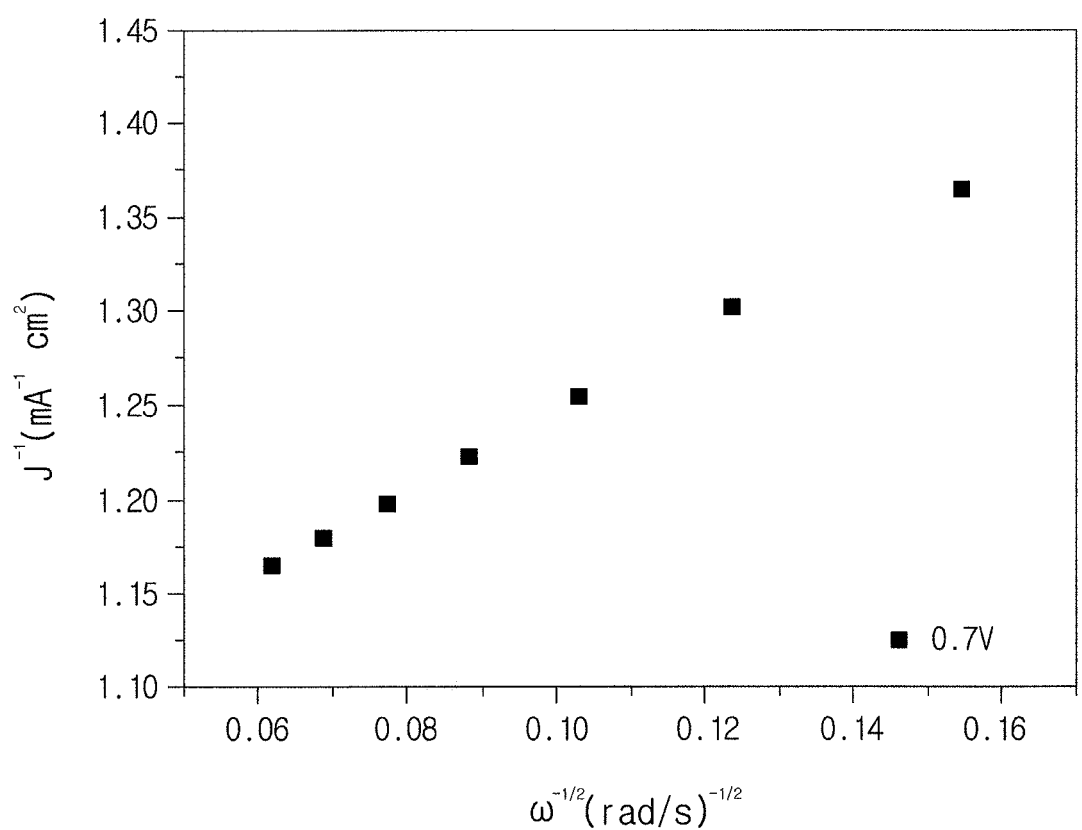

The electrode is connected to a rotating disk electrode and dipped in the 0.5 M oxygen-saturated $H_2SO_4$ solution to measure ORR. Cyclic voltammetry (CV) is performed until a voltage of a reversible hydrogen electrode (RHE) reaches to 1.0 V from 0.05 V by 20 cycles by Linear sweep voltammetry (LSV) at a scan rate of 10 mV/s from 1.0 to 0.1 V. In this experiment, Koutecky-Levich plots illustrated in FIGS. 15 and 16 are deduced while adjusting the electrode rotation speed from 400 rpm to 2500 rpm, and the result values of the Koutecky-Levich plots are used to calculate the number of electrons involved in the reaction.

The number of electrons involved in the reaction may be calculated using the following equations.

$$\frac{1}{j} = \frac{1}{j_k} + \frac{1}{j_L} \quad \text{Equation 1}$$

$$j_L = B\omega^{\frac{1}{2}} \quad \text{Equation 2}$$

$$B = 0.62nFC_oD_o^{\frac{2}{3}}v^{\frac{-1}{6}} \quad \text{Equation 3}$$

In Equations 1 to 3, $j_k$ is kinetic current, $J_L$ is limiting current, w is rotation speed, F is faraday constant, $C_0$ is $O_2$ concentration, $D_O$ is $O_2$ diffusion coefficient, and v is viscosity.

The number of electrons of the non-noble metal-based catalyst sample according to an exemplary embodiment involved in the reaction calculated by Equations 1 to 3 and the Koutecky-Levich plots is 3.95 at 0.7 V.

Based on the results of experiments, it may be confirmed that the non-noble metal-based catalyst according to an exemplary embodiment has a 4-e path. In other words, the non-noble metal-based catalyst according to an exemplary embodiment has high catalytic activity by eliminating unnecessary side reactions.

Hereinafter, conditions for efficiently introducing the non-noble metal-based catalyst into an electrode structure of fuel cells, in other words, experimental examples to deduce conditions to realize fuel cells optimized to the non-noble metal-based catalyst according to an exemplary embodiment will be described.

To this end, a single cell is assembled after manufacturing a membrane electrode assembly and performance of the single cell is analyzed.

A process of manufacturing the membrane electrode assembly and a process of assembling the single cell are as follows.

First, a non-noble metal-based catalyst solution according to an exemplary embodiment is prepared. More particularly, 50 g of the non-noble metal-based catalyst prepared by doping the porous carbon having anchoring sites with iron phthalocyanine is dispersed in 5 ml of a mixed solution of a 5 wt % Nafion solution and isopropanol for 30 minutes to prepare a non-noble metal-based catalyst solution.

Also, a platinum catalyst solution, as a material used to form an anode of the membrane electrode assembly, is prepared as follows. 50 mg of a platinum catalyst is dispersed in a mixed solution of 0.2 ml of distilled water, 5 ml of isopropanol, and 428.6 mg of a 5 wt % Nafion solution for 30 minutes to prepare a platinum catalyst solution.

The non-noble metal-based catalyst solution is coated on the surface of an electrode having an area of 1.5 cm×1.5 cm by hand spraying via catalyst coated substrate (CCS) and catalyst coated membrane (CCM) methods. Then, a single cell is assembled by fastening at a torque of 25 kgf*cm.

More particularly, the non-noble metal-based catalyst solution is coated on carbon paper (SGL 35 BC) by the CCS method, and the non-noble metal-based catalyst solution is coated on nafion membrane (Nafion 211) by the CCM method. Meanwhile, even when the coating is performed by the CCS method, a hot pressing is performed at 125° C. for 1 minute under a pressure of 70 kgf/cm². In the same manner, the platinum catalyst solution is coated on carbon paper and Nafion membrane. Through this process, 0.2 $mg_{pt}$/cm² of a platinum catalyst is loaded on an anode, and 0.5 to 3 mg/cm² of the non-noble metal-based catalyst is loaded on a cathode.

Next, performance of the single cell is analyzed under the following conditions.

Conditions for analyzing performance of the single cells commonly applied to FIGS. 17 to 20 are as follows. First, performance of the single cell is measured after maintaining the single cell with an open-circuit voltage for 2 hours at 65° C. at 100 percent humidity while supplying hydrogen and air such that amounts of hydrogen and air are 1.5 times and twice as much as those of stoichiometric amounts thereof, respectively. Methods of controlling conditions for the process will be described in more detail later.

First, an optimal spraying method used to prepare the single cell will be described with reference to FIG. 17.

Figure 17:
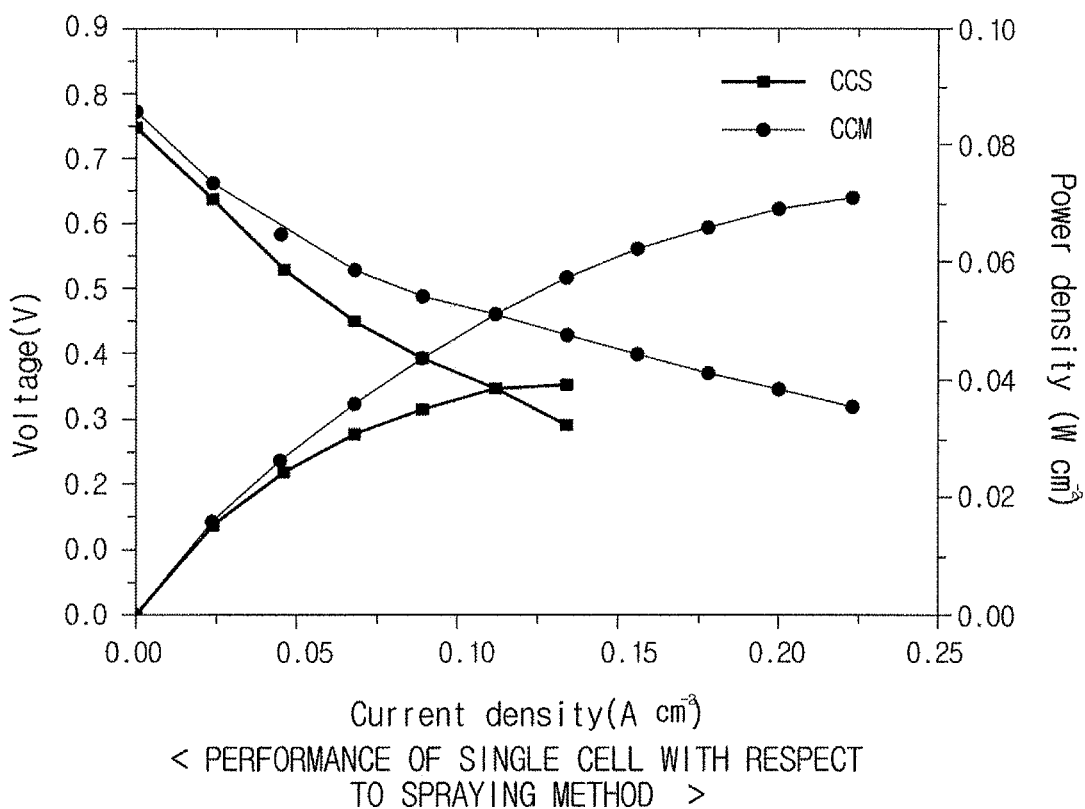
FIG. 17 is a graph illustrating changes in performance of single cells with respect to spraying methods.

FIG. 17 is a graph illustrating changes in performance of single cells with respect to spraying methods. FIG. 17 illustrates comparison of performance between a single cell using an MEA prepared by the CCS method and a single cell using an MEA prepared by the CCM method. Here, 0.2 $mg_{pt}$/cm² of a platinum catalyst is loaded on an anode, and 0.5 mg/cm² of the N-Phth is loaded on a cathode. Meanwhile, a mass ratio of Nafion to the catalyst is 1:1.5 in the solution used while spraying.

Referring to FIG. 17, it may be confirmed that current density and power density obtained by the CCM method are higher than those obtained by the CCS method at the same potential.

In general, a higher current density at the same potential indicates higher catalytic activity, and a higher power density at the same potential indicates better cell performance. Thus, it may be confirmed that the single cell obtained by the CCM method has better performance than that obtained by the CCS method.

Next, an optimal composition ratio of the catalyst solution used in the manufacture of the single will be described with reference to FIG. 18.

Figure 18:
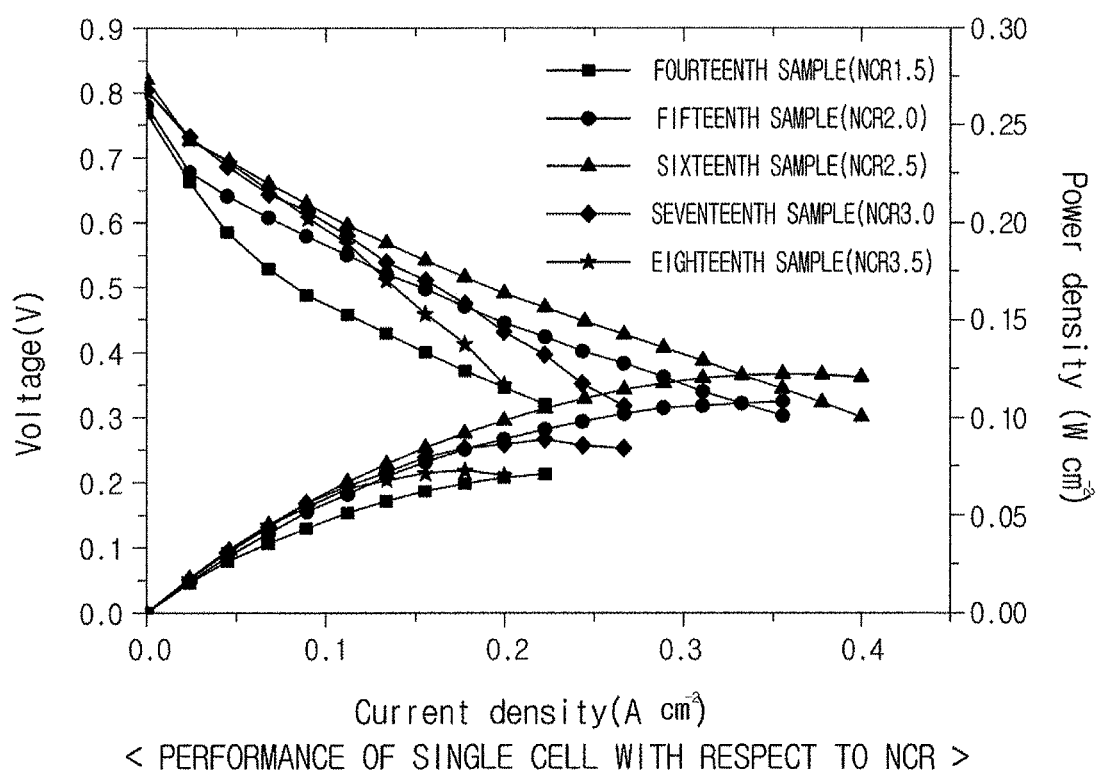
FIG. 18 is a graph illustrating changes in performance of single cells with respect to mass ratio of the Nafion ionomer to the non-noble metal-based catalyst, which are added to the catalyst solution.

FIG. 18 is a graph illustrating changes in performance of single cells with respect to mass ratio of the Nafion ionomer to the non-noble metal-based catalyst, which are added to the catalyst solution. Here, 0.2 $mg_{pt}/cm^2$ of a platinum catalyst is loaded on an anode, and 0.5 mg/cm² of the N-Phth is loaded on a cathode. Meanwhile, the CCM method is used as the spraying method.

All of fourteen to eighteenth samples used in this experiment are the N-Phth catalyst sample. In the preparation of the single cell using the non-noble metal-based catalyst according to an embodiment, the catalyst solution is prepared by mixing the non-noble metal-based catalyst with the Nafion ionomer and ethanol. To find out an optimal ratio of the non-noble metal-based catalyst, different mass ratios of the Nafion ionomer to the N-Phth catalyst are used in the fourteen to eighteen samples. Hereinafter, a mass ratio of the Nafion ionomer to the nonionic catalyst in the preparation of the catalyst solution will be referred to as a Nafion to catalyst ratio (NCR) for descriptive convenience. The fourteenth sample is prepared by adjusting the NCR to 1.5, the fifteenth sample is prepared by adjusting the NCR to 2, the sixteenth sample is prepared by adjusting the NCR to 2.5, the seventeenth sample is prepared by adjusting the NCR to 3, and the eighteenth sample is prepared by adjusting the NCR to 3.5.

The graph is interpreted in the same manner as FIG. 17. It may be confirmed that the single cell exhibits the best performance at the NCR of 2.5. It may be confirmed that a relatively large amount of the Nafion ionomer is required to efficiently use the non-noble metal-based catalyst according to an exemplary embodiment due to a wide surface area of the catalyst. On the contrary, if the NCR is greater than 2.5, performance of the single cell deteriorates. Thus, it may be confirmed that an excess of the Nafion ionomer may interrupt supply of oxygen, thereby deteriorating performance of the single cell.

Next, an optimal catalyst loading amount required to prepare a single cell will be described with reference to FIG. 19.

Figure 19:
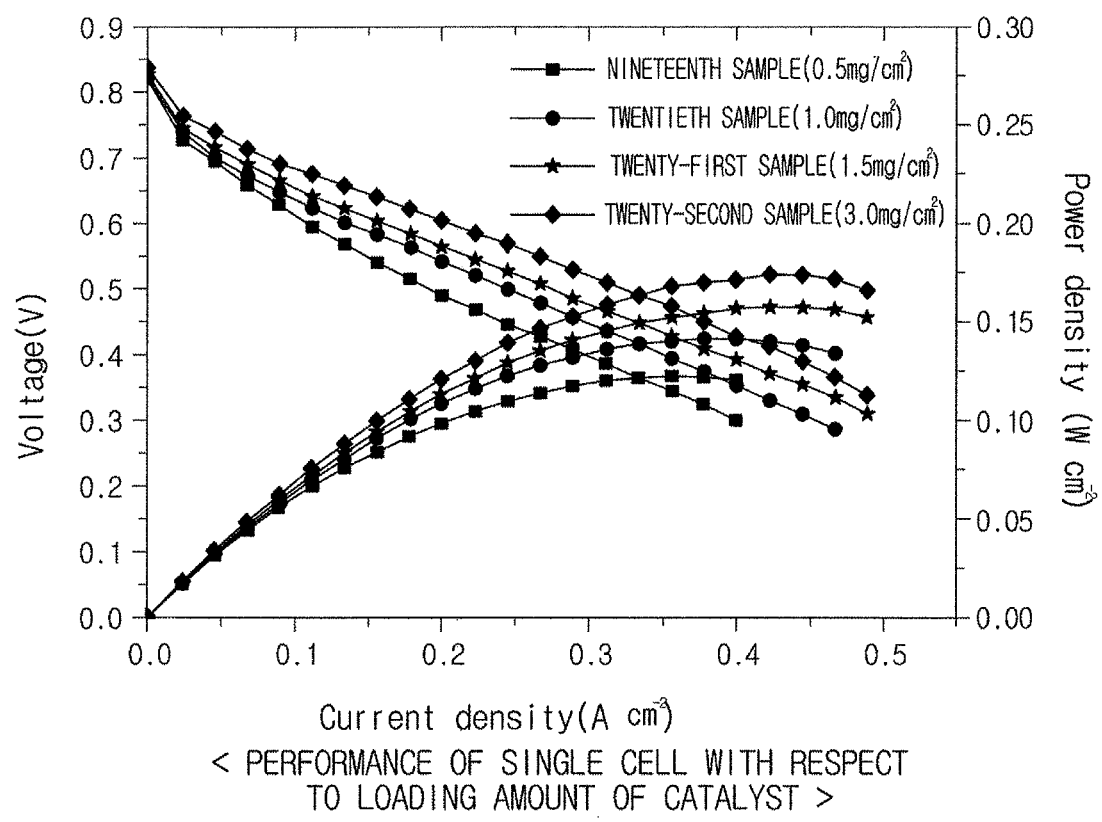
FIG. 19 is a graph illustrating changes in performance of single cells with respect to loading amounts of a catalyst.

FIG. 19 is a graph illustrating changes in performance of single cells with respect to loading amounts of a catalyst. Here, 0.2 $mg_{pt}/cm^2$ of a platinum catalyst is loaded on an anode, and a catalyst solution having an NCR of 2.5 is loaded on the cathode by the CCM method.

All of nineteenth to twenty-second samples used in this experiment are the N-Phth catalyst sample. To find out an optimal amount of the non-noble metal-based catalyst, the amounts of the catalyst loaded on the cathode in the preparation of the single cells are modified. The nineteenth sample is obtained by adjusting the catalyst loading amount to 0.5 mg/cm². The twentieth sample is obtained by adjusting the catalyst loading amount to 1.0 mg/cm². The twenty-first sample is obtained by adjusting the catalyst loading amount to 1.5 mg/cm². The twenty-second sample is obtained by adjusting the catalyst loading amount of 3.0.

The graph is interpreted in the same manner as FIG. 17. It may be confirmed that performance of the single cell is enhanced while the catalyst loading amount increases from 0.5 mg/cm² to 3.0 mg/cm². This is because mass transfer resistance is efficiently reduced by pores having a diameter of 20 nm or greater formed on the surface of the non-noble metal-based catalyst according to an embodiment.

Next, durability test results of single cells manufactured by using the non-noble metal-based catalyst according to an exemplary embodiment will be described with reference to FIG. 20.

Figure 20:
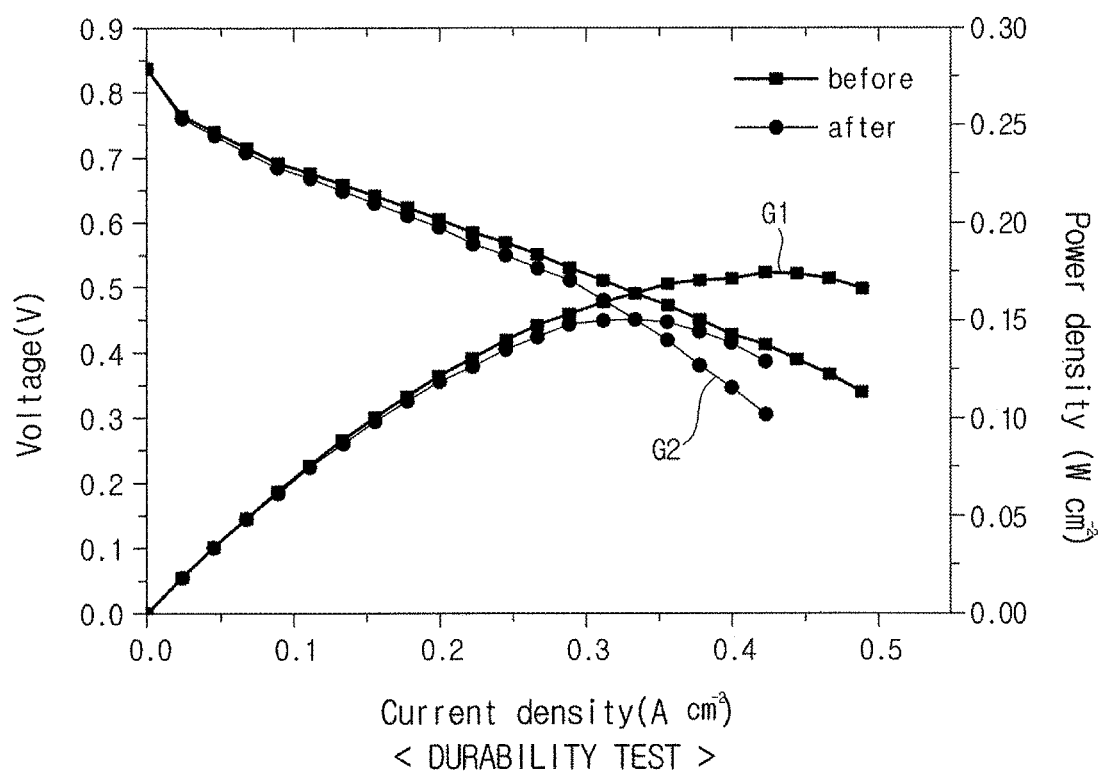
FIG. 20 is a graph illustrating durability test results of single cells.

FIG. 20 is a graph illustrating durability test results of single cells. Here, 0.2 $mg_{pt}/cm^2$ of a platinum catalyst is loaded on an anode, and 3.0 mg/cm² of the N-Phth catalyst is loaded on the cathode. In this regard, the non-noble metal-based catalyst solution having an NCR of 2.5 is loaded on the cathode by the CCM method.

First, initial performance of the single cell is measured, and the result is shown as G1. Then, after 1500 cycles at 50 mV/s between 0.6 V and 1.0 V, performance of the single cell is measured, and the result is shown as G2.

It may be confirmed that the activity is reduced by about 2.2% at 0.6 V based on the measured current densities. Thus, it may be confirmed that the single cell prepared using the non-noble metal-based catalyst according to an exemplary embodiment has excellent durability.

Experimental examples to deduce conditions for implementing fuel cells optimized to the non-noble metal-based catalyst material according to an exemplary embodiment have been described.

According to the non-noble metal-based catalyst and the fuel cell manufacturing using the same prepared according to the aforementioned methods, catalytic active sites are only formed on the surface of larger pores among the pores of the porous carbon by adjusting conditions for the manufacturing process. Thus, reactants easily approach the catalytic active sites in an actual driving environment and the catalytic active sites may be more efficiently utilized.

Hereinafter, effects of the position of the catalytic active sites on enhancing utilization of the catalytic active sites will be described with reference to FIGS. 21 to 23.

Figure 21:
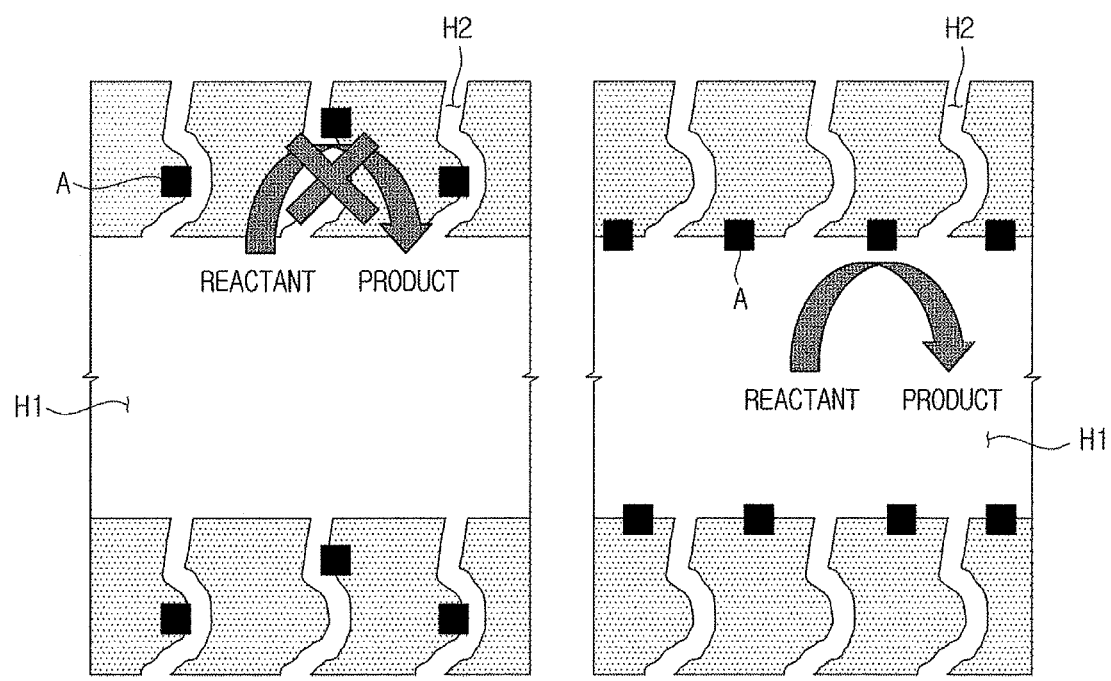
FIG. 21 is a diagram illustrating reaction of reactants in accordance with positions of catalytic active sites.

FIG. 21 is a diagram illustrating reaction of reactants in accordance with positions of catalytic active sites. FIGS. 22 and 23 are graphs illustrating ORR results and changes in performance of single cells with respect to positions of the catalytic active sites.

If the a catalytic active site A is formed at the second pore H2 that is an ultrafine pore as illustrated in a left diagram of FIG. 21, a reactant cannot easily approach the catalytic active site A, and thus functions of the catalytic active site A may not be efficiently performed.

On the contrary, in the non-noble metal-based catalyst sample according to an embodiment, the catalytic active site A is formed at the first pore H1 that is a micropore as illustrated in a right diagram of FIG. 21. Thus, functions of the catalytic active site A may be efficiently performed.

Figure 22:
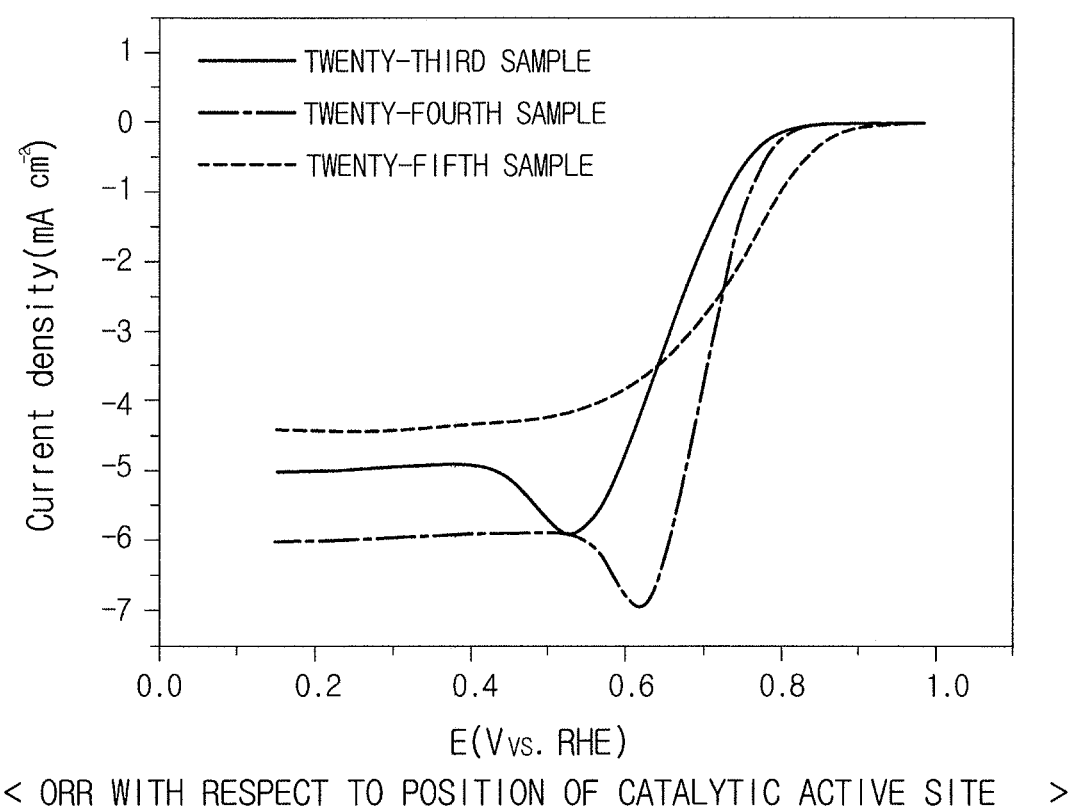
FIG. 22 and FIG. 23 are graphs illustrating ORR results and changes in performance of single cells with respect to positions of the catalytic active sites.

FIG. 22 illustrates ORR results of twenty-third to twenty-fifth samples measured using a 0.5 M oxygen-saturated $H_2SO_4$ solution, a non-noble metal-based catalyst in a loading amount of 815 μg/cm², and 40 wt % Pt/C in a loading amount of 16 μgpt/cm² at 1600 rpm. The catalytic active sites are formed not only in the first pores but also the second pores in the twenty-third sample. The twenty-fourth sample is prepared by using the N-Phth, and the twenty-fifth sample is prepared by using a platinum catalyst commonly used in the art.

Figure 23:
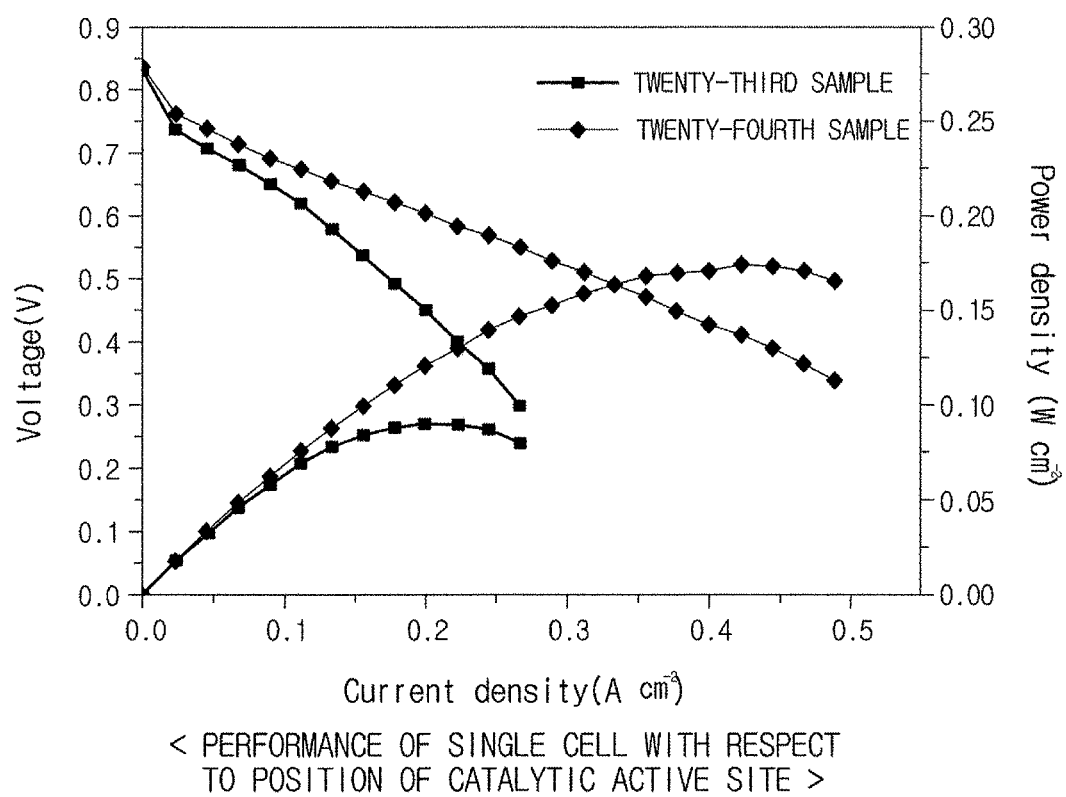

FIG. 23 illustrates changes in performance of the single cells prepared using the twenty-third and twenty-fourth samples after maintaining the single cells at 65° C. while supplying hydrogen and air such that amounts of hydrogen and air are 1.5 times and twice as much as those of stoichiometric amounts thereof, respectively. Here, 0.2 $mg_{pt}/cm^2$ of a platinum catalyst is loaded on an anode, 3.0 $mg/cm^2$ of the N-Phth is loaded on a cathode, and the NCR is 2.5 in the catalyst solution used during spraying.

Referring to FIGS. 22 and 23, it may be confirmed that voltage rapidly decreases as the current density increases in the twenty-third sample in which the catalytic active sites are formed in the ultrafine pores. This is because mass transfer resistance increases due to difficulty in approaching the catalytic active site.

However, the voltage does not rapidly decrease as the current density increases in the twenty-fourth sample and the twenty-fourth sample exhibits better performance of the single cell than the twenty-thirteenth sample.

Based on the results of experiments, it may be confirmed that the catalytic active sites may be more efficiently used by allowing the reactants to easily approach the active sites in the actual driving environment by selectively controlling the position of the catalytic active sites formed at the pores of the porous carbon.

As is apparent from the above description, according to the non-noble metal-based catalyst and the manufacturing method thereof, utilization of the catalytic active sites may be enhanced by allowing the reactants to easily approach the active sites in the actual driving environment by forming the active sites only on the surfaces of the micropores among the pores of the porous carbon by controlling conditions for the manufacturing process.

Also, excellent catalyst performance may be obtained by reducing mass transfer resistance in the membrane electrode assembly by introducing a nanoporous carbon structure having a regular structure and relatively large pores thereinto.

Also, the catalytic activity may be improved by enhancing interactions with the catalyst precursors by introducing anchoring sites into the surface of the porous carbon.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A non-noble metal-based catalyst for an electrode of a fuel cell comprising:
a porous carbon having a first pore and a second pore smaller than the first pore,
wherein the first pore has a pore size of about 5 to 100 nm and has an inner wall into which an active site of the non-noble metal-based catalyst is introduced,
wherein the active site of the non-noble metal-based catalyst is formed by a non-noble metal-based catalyst precursor, and the non-noble metal-based catalyst precursor has a diameter less than that of the first pores and greater than that of the second pores.

2. The non-noble metal-based catalyst according to claim 1, wherein the porous carbon has a structure in which the first pore and the second pore are uniformly connected in a three-dimensional space.

3. The non-noble metal-based catalyst according to claim 1, wherein the first pore has a pore size of about 15 to 60 nm.

4. The non-noble metal-based catalyst according to claim 1, wherein an active site of the non-noble metal-based catalyst is provided in a form represented by Formula 1 below:

$$M_xN_y \quad \text{Formula 1}$$

wherein x is an integer from greater than 0 to 1, y is an integer from 1 to 4, and M is a transition metal selected from iron (Fe), cobalt (Co), manganese (Mn), nickel (Ni) and chromium (Cr).

5. The non-noble metal-based catalyst according to claim 1, wherein the non-noble metal-based catalyst precursor has a form in which at least one of phthalocyanine, phthalocyanine tetrasulfonate, octabutoxy phthalocyanine, hexadecafluoro phthalocyanine, octakis octyloxy phthalocyanine, tetra-tert-butyl phthalocyanine, tetraaza phthalocyanine, tetraphenoxy phthalocyanine, tetra-tert-butyl tetrakis dimethylamino phthalocyanine, tetrakis cumylphenoxy phthalocyanine, tetrakis pyridiniomethyl phthalocyanine, tetranitrophthalocyanine, naphthalocyanine, tetra-tert-butyl naphthalocyanine, tetraphenyl porphine, tetrakis pentafluorophenyl porphyrin, tetrakis methylpyridinio porphyrin tetratoluenesulfonate, tetraki strimethylammoniophenyl porphyrin tetratoluenesulfonate, tetramethyl divinyl porphinedipropionic acid, tetrapyridyl porphine, octaethyl porphyrin, tetrakis methoxyphenyl porphine, tetraphenylporphine tetracarboxylic acid, tetrakis hydroxyphenyl porphine, tetrakis sulfonatophenyl porphine, etioporphyrin, 1, 10-phenanthroline, 1, 10-phenanthroline-5 ,6-dionedimethyl-1, 10-phenanthroline, dimethyl-1, 10-phenanthroline, dimethoxy-1, 10-phenanthroline, dimethoxy-1, 10-phenanthroline, amino-1, 10-phenanthroline, methyl-1, 10-phenanthroline, dihydroxy-1, 10-phenanthroline, tetramethyl-1, 10-phenanthroline, chloro-1, 10-phenanthroline, dichloro-1, 10-phenanthroline, nitro-1, 10-phenanthroline, bromo-1, 10-phenanthroline, tetrabromo- 1, 10-phenanthroline, pyrazino[1, 10]phenanthroline, diphenyl-1, 10-phenanthroline, dimethyl diphenyl-1, 10-phenanthroline, ethenyl formyl(hydroxy trimethyltetradecyl) trimethyl porphine dipropanoato, diethenyl tetramethyl porphine dipropanoato, bis ((amino carboxyethyl)thio)ethyl tetramethyl porphine dipropanoato, dihydro dihydroxy tetramethyl divinyl porphine dipropionic acid lactonato, ethenyl(hydroxy trimethyl tetradecatrienyl) tetramethyl porphine dipropanoato, carboxyethenyl carboxyethyl dihydro bis(hydroxymethyl) tetramethyl porphine dicarboxylato, (dimethylbenzimidazolyl)cyanocobamide, curtis macrocycle, Jäager macrocycle and DOTA macrocycle, is coordinated to a metal.

6. The non-noble metal-based catalyst according to claim 5, wherein the metal comprises at least one transition metal selected from iron (Fe), cobalt (Co), manganese (Mn), nickel (Ni), and chromium (Cr).

7. The non-noble metal-based catalyst according to claim 1, wherein the non-noble metal-based catalyst precursor comprises a transition metal having a weight of about 1 to 50 wt % based on a total weight of the porous carbon.

8. The non-noble metal-based catalyst according to claim 1, wherein the porous carbon has an anchoring site introduced into a surface of a pore of the porous carbon to enhance interactions between the porous carbon and the non-noble metal-based catalyst precursor.

\* \* \* \* \*